United States Patent [19]

Sherwood, Jr.

[11] Patent Number: 5,827,421
[45] Date of Patent: *Oct. 27, 1998

[54] HYDROCONVERSION PROCESS EMPLOYING CATALYST WITH SPECIFIED PORE SIZE DISTRIBUTION AND NO ADDED SILICA

[75] Inventor: David Edward Sherwood, Jr., Beaumont, Tex.

[73] Assignee: Texaco Inc, White Plains, N.Y.

[ * ] Notice: The term of this patent shall not extend beyond the expiration date of Pat. No. 5,435,908.

[21] Appl. No.: 518,774

[22] Filed: Aug. 24, 1995

Related U.S. Application Data

[60] Continuation-in-part of Ser. No. 425,971, Apr. 20, 1995, Pat. No. 5,545,602, which is a division of Ser. No. 242,995, May 16, 1994, Pat. No. 5,435,908, which is a continuation of Ser. No. 953,176, Sep. 29, 1992, abandoned, which is a continuation-in-part of Ser. No. 870,970, Apr. 20, 1992, Pat. No. 5,399,529.

[51] Int. Cl.$^6$ .......................... C10G 47/02; C10G 45/04; C10G 29/04; B01J 27/14
[52] U.S. Cl. ...................... 208/112; 208/114; 208/208 R; 208/216 R; 208/216 PP; 208/243; 208/244; 208/292; 208/295; 502/208; 502/211; 502/213; 502/305; 502/313; 502/315; 502/321; 502/326
[58] Field of Search ...................... 502/208, 210, 502/211, 213, 305, 313, 315, 321, 325, 326; 208/112, 121, 114, 208 R, 209, 216 R, 211 PP, 217, 243, 244, 249, 251 R, 292, 295, 299

[56] References Cited

U.S. PATENT DOCUMENTS

| 4,395,328 | 7/1983 | Hensley, Jr. et al. ................ 208/251 H |
|---|---|---|
| 4,495,062 | 1/1985 | Hensley, Jr. et al. .................... 208/111 |
| 4,520,128 | 5/1985 | Morales et al. .......................... 502/210 |
| 4,778,588 | 10/1988 | Brandes et al. .......................... 208/213 |
| 4,886,594 | 12/1989 | Miller ...................................... 208/210 |
| 5,397,456 | 3/1995 | Dai et al. ................................. 208/108 |
| 5,399,259 | 3/1995 | Dai et al. ............................... 208/216 PP |
| 5,416,054 | 5/1995 | Dai et al. ................................. 502/211 |
| 5,435,908 | 7/1995 | Nelson et al. ...................... 208/216 PP |
| 5,514,273 | 5/1996 | Sherwood, Jr. et al. .......... 208/216 PP |
| 5,545,602 | 8/1996 | Nelson et al. ........................... 502/314 |

*Primary Examiner*—Mark L. Bell
*Assistant Examiner*—Patricia L Hailey
*Attorney, Agent, or Firm*—Henry H. Gibson; Arnold White & Durkee

[57] ABSTRACT

A process for hydrotreating a charge hydrocarbon feed containing components boiling above 1000° F. and sulfur, metals, and carbon residue, to provide product containing decreased levels of components having a boiling point greater than 1000° F., decreased levels of sulfur, particularly decreased sulfur contents in the unconverted 1000° F.+ boiling point products, and reduced sediment, which comprises:

contacting said hydrocarbon feed with hydrogen at isothermal hydroprocessing conditions in the presence of, as catalyst, a porous alumina support containing ≦0.5 wt % of silica, wherein no silicon containing components, particularly silicon oxide, are intentionally added to the alumina, alumina support, impregnating solution or impregnating solutions, and bearing 2.2–6 wt % of a Group VIII metal oxide, 7–24 wt % of a Group VIB metal oxide and 0.0–2.0 wt % of a phosphorus oxide, said catalyst having a Total Surface Area of 195–230 m$^2$/g, a Total Pore Volume of 0.82–98 cc/g, and a Pore Diameter Distribution wherein 27.0–34.0% of the Total Pore Volume is present as macropores of diameter greater than 250 Å, 66.0–73.0% of the Total Pore Volume is present as micropores of diameter less than 250 Å, 55–64.5% of the Pore Volume in pores with diameters <250 Å is present as micropores of diameter ±25 Å about a pore mode by volume of 110–130 Å, and less than 0.05 cc/g of micropore volume is present in micropores with diameters less than 80 Å.

21 Claims, No Drawings

HYDROCONVERSION PROCESS EMPLOYING CATALYST WITH SPECIFIED PORE SIZE DISTRIBUTION AND NO ADDED SILICA

CROSS-REFERENCE

This application is a Continuation-in-Part of application Ser. No. 08/425,971, filed on Apr. 20, 1995, now U.S. Pat. No. 5,545,602, which is a Divisional of application Ser. No. 08/242,995, filed on May 16, 1994, now U.S. Pat. No. 5,435,908, which is a Continuation of application Ser. No. 07/953,176, filed on Sep. 29, 1992, now abandoned, which is a Continuation-in-Part of application Ser. No. 07/870,970, filed on Apr. 20, 1992, now U.S. Pat. No. 5,399,529.

FIELD OF THE INVENTION

This invention relates to a process for hydrotreating a hydrocarbon feed. More particularly it relates to a hydroconversion process employing a catalyst with a specified pore size distribution and method of impregnation/finishing which achieves improved levels of hydrodesulfurization, particularly improved sulfur removal from the unconverted 1000° F. products, and reduced sediment make and which allows operations at higher temperatures and higher levels of hydroconversion of feedstock components having a boiling point greater than 1000° F. to products having a boiling point less than 1000° F. and additional hydrodesulfurization.

BACKGROUND OF THE INVENTION

As is well known to those skilled in the art, it is desirable to convert heavy hydrocarbons, such as those having a boiling point above about 1000° F., into lighter hydrocarbons which are characterized by higher economic value. It is desirable to treat hydrocarbon feedstocks, particularly petroleum residue, to achieve other goals including hydrodesulfurization (HDS), carbon residue reduction (CRR), and hydrodemetallation (HDM)—the latter particularly including removal of nickel compounds (HDNi) and vanadium compounds (HDV).

These processes typically employ hydrotreating catalysts with specified ranges of pores having relatively small diameters (i.e. micropores, herein defined as pores having diameters less than 250 Å) and pores having relatively large diameters (i.e. macropores, herein defined as pores having diameters greater than 250 Å).

One approach to developing improved catalysts for petroleum resid processing has involved enlarging the micropore diameters of essentially monomodal catalysts (having no significant macroporosities) to overcome diffusion limitations. Catalysts which are essentially monomodal with small micropore diameters and low macroporosities designed for improved petroleum resid HDS include for example, those disclosed in U.S. Pat. Nos. 4,738,944; 4,652,545; 4,341,625; 4,309,278; 4,306,965; 4,297,242; 4,066,574; 4,051,021; 4,048,060 (first-stage catalyst); 3,770,617; and 3,692,698, discussed herein. Essentially monomodal catalysts with larger micropore diameters and low macroporosities designed for improved petroleum resid HDM are typified by those disclosed in U.S. Pat. Nos. 4,328,127; 4,082,695; 4,048,060 (second-stage catalyst); and 3,876,523, discussed herein.

U.S. Pat. No. 4,738,944 (Robinson et al.) discloses a catalyst composition useful in the hydrotreatment of hydrocarbon oils, the catalyst containing nickel and phosphorus and about 19–21.5% Mo (calculated as the oxide) on a porous refractory oxide, having a narrow pore size distribution wherein at least 10% of the Total Pore Volume is in pores having diameters less than 70 Å, at least 75% of the Total Pore Volume is in pores having diameters between 50–110 Å, at least 60% of the Total Pore Volume is in pores having diameters within about 20 Å above and below the average pore diameter, and at most 25% of the Total Pore Volume, most preferably less than 10% of the Total Pore Volume is in pores having diameters greater than 110 Å.

U.S. Pat. No. 4,652,545 (Lindsley et al.) discloses a catalyst composition useful in the hydroconversion of heavy oils, the catalyst containing 0.5–5% Ni or Co and 1.8–18% Mo (calculated as the oxides) on a porous alumina support, having 15–30% of the Ni or Co in an acid extractable form, and further characterized by having a Total Pore Volume (TPV) of 0.5–1.5 cc/g with a pore diameter distribution such that (i) at least 70% TPV is in pores having 80–120 Å diameters, (ii) less than 0.03 cc/g of TPV is in pores having diameters of less than 80 Å, and (iii) 0.05–0.1 cc/g of TPV is in pores having diameters of greater than 120 Å.

U.S. Pat. No. 4,341,625 (Tamm) discloses a process for hydrodesulfurizing a metal-containing hydrocarbon feedstock which comprises contacting the feedstock with a catalyst comprising at least one hydrogenation agent (i.e. Group VIB or Group VIII metal, or combinations thereof) on a porous support, the catalyst being further characterized by having a TPV of 0.5–1.1 cc/g with at least 70% TPV in pores having diameters of 80–150 Å and less than 3% TPV in pores having diameters greater than 1000 Å.

U.S. Pat. No. 4,309,278 (Sawyer) discloses a process for the hydroconversion of a hydrocarbon feedstock comprising contacting the feedstock with hydrogen and a catalyst in a fixed bed, moving bed, ebullated bed, slurry, disperse phase, or fluidized bed reactor, where the catalyst comprises a hydrogenation component (i.e. Group VIB or Group VIII metal) on a porous support, and is further characterized by having a BET Surface Area of 250–450 $m^2/g$, a BET Pore Volume of 0.9–2.0 cc/g with no more than 0.05–0.20 cc/g of TPV in pores having diameters of greater than 400 Å.

U.S. Pat. No. 4,306,965 (Hensley, Jr. et al.) discloses a process for the hydrotreatment of a hydrocarbon stream comprising contacting the stream with hydrogen and a catalyst, the catalyst comprising chromium, molybdenum, and at least one Group VIII metal on a porous support, further characterized by having a TPV of 0.4–0.8 cc/g with 0–50% TPV in pores having diameters smaller than 50 Å, 30–80% TPV in pores having diameters of 50–100 Å, 0–50% TPV in pores having diameters of 100–150 Å, and 0–20% TPV in pores having diameters greater than 150 Å.

U.S. Pat. No. 4,297,242 (Hensley, Jr. et al.) discloses a two-stage process for the catalytic hydrotreatment of hydrocarbon streams containing metal and sulfur compounds, the process comprises: (i) first contacting the feedstock with hydrogen and a demetallation catalyst comprising a Group VIB and/or Group VIII metal; and (ii) thereafter reacting the effluent with a catalyst consisting essentially of at least one Group VIB metal on a porous support, and having a TPV of 0.4–0.9 cc/g and a pore size distribution such that pores having diameters of 50–80 Å constitute less than 40% TPV, pores having diameters of 80–100 Å constitute 15–65% TPV, pores having diameters of 100–130 Å constitute 10–50% TPV, and pores having diameters of greater than 130 Å less than 15% TPV.

U.S. Pat. No. 4,066,574 (Tamm) discloses a catalyst composition useful in the hydrodesulfurization of a hydrocarbon feedstock containing organometallic compounds, the catalyst comprising Group VIB and Group VIII metal components on a porous support, and having a TPV of 0.5–1.1 cc/g with a pore diameter distribution such that at least 70% TPV is in pores of diameters of 80–150 Å and less than 3% TPV is in pores having diameters greater than 1000 Å.

U.S. Pat. No. 4,051,021 (Hamner) discloses a catalytic process for the hydrodesulfurization of a hydrocarbon feed which comprises contacting the feed with hydrogen and a catalyst, the catalyst comprising a Group VIB and Group VIII metal on a porous support, having a TPV of 0.3–1.0 cc/g with a pore diameter distribution such that greater than 50% TPV is in pores of diameters of 70–160 Å, and pores having diameters below 70 Å and above 160 Å are minimized.

U.S. Pat. No. 4,048,060 (Riley) discloses a two-stage process for hydrodesulfurizing a heavy hydrocarbon feed which comprises: (i) contacting the feed with hydrogen and a first catalyst to produce a first hydrodesulfurized hydrocarbon product, the first catalyst comprising a Group VIB and Group VIII metal on a porous support and having a mean pore diameter of 30–60 Å; and (ii) contacting the first hydrodesulfurized hydrocarbon product with hydrogen and a second catalyst under hydrodesulfurization conditions, the second catalyst comprising a Group VIB and Group VIII metal on a porous support, further characterized by having a TPV of 0.45–1.50 cc/g with 0–0.5 cc/g of TPV in pores having diameters greater than 200 Å, 0–0.05 cc/g of TPV in pores having diameters below 120 Å, and at least 75% TPV in pores having diameters ±10 Å of a mean pore diameter of 140–190 Å.

U.S. Pat. No. 3,770,617 (Riley et al.) discloses a process for the desulfurization of a petroleum hydrocarbon feed comprising contacting the feed with hydrogen and a catalyst, the catalyst comprising a Group VIB or Group VIII metal on a porous support having greater than 50% TPV in pores of 30–80 Å, less than 4% TPV in pores having diameters 200–2000 Å, and at least 3% TPV in pores having diameters greater than 2000 Å.

U.S. Pat. No. 3,692,698 (Riley et al.) discloses a catalyst useful in hydroprocessing of heavy feed stocks, the catalyst comprising a mixture of Group VIB and Group VIII metals on a porous support having a pore size distribution such that a major portion of its TPV is in pores of diameters ranging from 30–80 Å, less than 4% TPV is in pores of diameters of 200–2000 Å, and at least 3% TPV is in pores of diameters greater than 2000 Å.

U.S. Pat. No. 4,328,127 (Angevine et al.) discloses a catalyst composition for use in the hydrodemetallation-desulfurization of residual petroleum oils, the catalyst comprising a hydrogenating component (i.e. Group VIB or Group VIII metal, or combinations thereof) on a porous support, further characterized by having a TPV of 0.45–1.5 cc/g with 40–75% TPV in pores having diameters of 150–200 Å, and up to 5% TPV in pores having diameters of greater than 500 Å.

U.S. Pat. No. 4,082,695 (Rosinski et al.) discloses a catalyst for use in the demetallation and desulfurization of petroleum oils, the catalyst comprising a hydrogenating component (i.e. cobalt and molybdenum) on a porous support, and having a surface area of 110–150 m²/g and a pore size distribution such that at least 60% of TPV is in pores having diameters of 100–200 Å and not less than 5% TPV is in pores having diameters greater than 500 Å.

U.S. Pat. No. 3,876,523 (Rosinski et al.) discloses a process for the demetallizing and desulfurizing of residual petroleum oil comprising contacting the oil with hydrogen and a catalyst, the catalyst comprising a Group VIB and Group VIII metal on a porous support having a pore size distribution such that greater than 60% TPV is in pores having diameters of 100–200 Å, at least 5% TPV is in pores having diameters greater than 500 Å, 10% TPV or less is in pores having diameters less than 40 Å, and the surface area of the catalyst is 40–150 m²/g.

Early petroleum distillate hydrotreating catalysts generally were monomodal catalysts with very small micropore diameters (less than say 100 Å) and rather broad pore size distributions. First generation petroleum resid hydrotreating catalysts were developed by introducing a large amount of macroporosity into a distillate hydrotreating catalyst pore structure to overcome the diffusion resistance of large molecules. Such catalysts, which are considered fully bimodal HDS/HDM catalysts, are typified by U.S. Pat. No. 4,746,419, 4,395,328, 4,395,329, and 4,089,774, discussed herein.

U.S. Pat. No. 4,746,419 (Peck et al.) discloses an improved hydroconversion process for the hydroconversion of heavy hydrocarbon feedstocks containing asphaltenes, metals, and sulfur compounds, which process minimizes the production of carbonaceous insoluble solids and catalyst attrition rates. Peck et al. employs a catalyst which has 0.1 to 0.3 cc/g of its pore volume in pores with diameters greater than 1,200 Å and no more than 0.1 cc/g of its pore volume in pores having diameters greater than 4,000 Å. The instant invention will be distinguished from Peck, et al. (U.S. Pat. No. 4,746,419) in that Peck discloses only features of macropore size distribution useful for minimizing the production of carbonaceous insoluble solids and does not disclose a pore size distribution which would provide additional hydrodesulfurization activities, whereas, the catalysts of the instant invention require a unique pore size distribution, in addition to a specific method of impregnating/finishing, in order to provide additional hydrodesulfurization. The instant invention gives improved levels of hydrodesulfurization, particularly improved sulfur removal from the unconverted 1000° F. products, and reduced sediment make at the same operating conditions compared to operations with a commercial vacuum resid hydroconversion catalyst having a macropore size distribution which satisfies the requirements of Peck, et al. (U.S. Pat. No. 4,746,419). The instant invention also allows operations at higher temperatures and higher levels of hydroconversion of feedstock components having a boiling point greater than 1000° F. to products having a boiling point less than 1000° F. with improved levels of hydrodesulfurization compared to operations with a commercial vacuum resid hydroconversion catalyst having a macropore size distribution which satisfies the requirements of Peck, et al. (U.S. Pat. No. 4,746,419).

U.S. Pat. No. 4,395,328 (Hensley, Jr. et al.) discloses a process for the hydroconversion of a hydrocarbon stream containing asphaltenes and a substantial amount of metals, comprising contacting the stream (in the presence of hydrogen) with a catalyst present in one or more fixed or ebullating beds, the catalyst comprising at least one metal which may be a Group VIB or Group VIII metal, an oxide of phosphorus, and an alumina support, where the alumina support material initially had at least 0.8 cc/g of TPV in pores having diameters of 0–1200 Å, at least 0.1 cc/g of TPV is in pores having diameters of 1200–50,000 Å, a surface area in the range of 140–190 m²/g, and the support material was formed as a composite comprising alumina and one or more oxides of phosphorus into a shaped material and was thence heated with steam to increase the average pore diameter of the catalyst support material prior to impregnation with active metals. The instant invention is distinguished from Hensley, Jr., et al. in that the support of the instant invention does not contain one or more oxides of phosphorus, is not heated with steam to increase the average pore diameter, and requires a higher surface area of about 229–307 m$^2$/g and there is a much more precise definition of pore volume distribution.

U.S. Pat. No. 4,395,329 (Le Page et al.) discloses a hydrorefining process of a high metal-containing feedstock employing a catalyst containing alumina, a metal from group VI and a metal from the iron group, the catalyst having a Total Surface Area of 120–200 m$^2$/g, a Total Pore Volume of 0.8–1.2 cc/g, and a Pore Diameter Distribution whereby 0–10% of the Total Pore Volume is present as micropores with diameters less than 100 Å, 35–60% of the Total Pore Volume is in pores with diameters of 100–600 Å, and 35–55% of the Total Pore Volume is present as macropores of diameter greater than 600 Å. The instant invention is distinguished from Le Page et al. (U.S. Pat. No. 4,395,329) in that Le Page et al. requires 35–55% of the TPV in pores with a diameter >600 Å and the catalysts of the instant invention have only about 17–27% of the TPV in pores greater than 600 Å.

U.S. Pat. No. 4,089,774 (Oleck et al.) discloses a process for the demetallation and desulfurization of a hydrocarbon oil comprising contacting the oil with hydrogen and a catalyst, the catalyst comprising a Group VIB metal and an iron group metal (i.e. iron, cobalt, or nickel) on a porous support, and having a surface area of 125–210 m$^2$/g and TPV of 0.4–0.65 cc/g with at least 10% TPV in pores having diameters less than 30 Å, at least 50% of pore volume accessible to mercury being in pores having diameters of 30–150 Å, and at least 16.6% of pores accessible to mercury being in pores having diameters greater than 300 Å. The instant invention is distinguished from Oleck et al. (U.S. Pat. No. 4,089,774) in that Oleck et al. requires a relatively low Total Pore Volume of only 0.4–0.65 cc/g, whereas, the catalysts of the instant invention require much higher Total Pore Volumes of 0.82–0.98 cc/g.

U.S. Pat. No. 5,221,656, to Clark et al. discloses a hydroprocessing catalyst comprising at least one hydrogenation metal selected from the group consisting of the Group VIB metals and Group VIII metals deposited on an inorganic oxide support, said catalyst characterized by a surface area of greater than about 220 m$^2$/g, a pore volume of 0.23–0.31 cc/g in pores with radii greater than about 600 Å (i.e., in pores with diameters greater than 1200 Å), an average pore radius of about 30–70 Å in pores with radii less than about 600 Å (i.e., an average pore diameter of about 60–140 Å in pores with diameters less than about 1200 Å), and an incremental pore volume curve with a maximum at about 20–50 Å radius (i.e., at about 40–100 Å diameter). In the instant invention, pores having a diameter greater than 1200 Å are only about 0.12–0.20 cc/g and the incremental pore volume curve has a maximum (i.e., Pore Mode) at 110–130 Å.

A recent approach to developing improved catalysts for the hydroconversion of feedstock components having a boiling point greater than 1000° F. to products having a boiling point less than 1000° F. has involved the use of catalysts having micropores intermediate between the above described monomodal HDS and HDM catalysts with pore volumes in the HDS type of range and with macroporosities sufficient to overcome the diffusion limitations for conversion of feedstock components having boiling points greater than 1000° F. into products having boiling points less than 1000° F. but limited macroporosities so as to limit poisoning of the interiors of the catalyst particles. Such catalysts are described in U.S. Pat. No. 5,397,456 (To Texaco as assignee of Dai et al.) and copending U.S. application Ser. No. 08/130,472 (D# 92,067), discussed herein.

U.S. Pat. No. 5,397,456 (to Texaco as assignee of Dai et al.) discloses a catalyst composition useful in the hydroconversion of a sulfur- and metal-containing feedstock comprising an oxide of a Group VIII metal and an oxide of a Group VIB metal and optionally phosphorus on a porous alumina support, the catalyst having a Total Surface Area of 240–310 m$^2$/g, a Total Pore Volume of 0.5–0.75 cc/g, and a Pore Diameter Distribution whereby 63–78% of the Total Pore Volume is present as micropores of diameter 55–115 Å and 11–18% of the Total Pore Volume is present as macropores of diameter greater than 250 Å. The heavy feedstocks are contacted with hydrogen and with the catalyst. The catalyst is maintained at isothermal conditions and is exposed to a uniform quality of feed. The process of Dai et al. is particularly effective in achieving desired levels of hydroconversion of feedstock components having a boiling point greater than 1000° F. to products having a boiling point less than 1000° F. The instant invention is distinguished from U.S. Pat. No. 5,397,456 in that Dai et al. requires a catalyst with a Pore Diameter Distribution wherein 63–78% of the Total Pore Volume is present as micropores of diameter 55–115 Å and 11–18% of the Total Pore Volume is present as macropores of diameter greater than 250 Å, whereas, the catalysts employed in the instant invention have only about 20–35% of the Total Pore Volume present as micropores of diameter 55–115 Å and 27–34% of the Total Pore Volume is present as macropores of diameter greater than 250 Å.

In related copending U.S. application Ser. No. 08/130,472 (D# 92,067) there is disclosed a hydrotreating process and catalyst wherein 50–62.8% of the TPV is present in micropores of diameter 55–115 Å and 20–30.5% of the TPV is present as macropores of diameter greater than 250 Å. In the instant case, the catalyst has only about 20–35% of the TPV present in pores having diameter of 55–115 Å.

Another recent approach to developing improved catalysts for petroleum resid processing has involved the use of catalysts having micropore diameters intermediate between the above described monomodal HDS and HDM catalysts, as well as sufficient macroporosities so as to overcome the diffusion limitations for petroleum bottoms HDS (i.e., sulfur removal from hydrocarbon product of a hydrotreated petroleum resid having a boiling point greater than 1000° F.) but limited macroporosities to limit poisoning of the interiors of the catalyst particles. Catalysts with micropore diameters intermediate between the above described monomodal HDS and HDM catalysts with limited macroporosities include those of U.S. Pat. Nos. 4,941,964, 5,047,142 and 5,399,259 and copending U.S. application Ser. No. 08/425,971 (D# 92,030-C1-D1), which is a divisional of U.S. Pat. No. 5,435,908, discussed herein.

U.S. Pat. No. 4,941,964 (to Texaco as assignee of Dai, et al.) discloses a process for the hydrotreatment of a sulfur- and metal-containing feed which comprises contacting said feed with hydrogen and a catalyst in a manner such that the catalyst is maintained at isothermal conditions and is exposed to a uniform quality of feed, the catalyst comprising an oxide of a Group VIII metal, an oxide of a Group VIB metal and 0–2.0 weight % of an oxide of phosphorus on a porous alumina support, having a surface area of 150–210 m/g and a Total Pore Volume (TPV) of 0.50–0.75 cc/g such that 70–85% TPV is in pores having diameters of 100–160 Å and 5.5–22.0% TPV is in pores having diameters of greater than 250 Å.

U.S. Pat. No. 5,047,142 (to Texaco as assignee of Sherwood, Jr., et al.), discloses a catalyst composition useful in the hydroprocessing of a sulfur and metal-containing feedstock comprising an oxide of nickel or cobalt and an oxide of molybdenum on a porous alumina support in such a manner that the molybdenum gradient of the catalyst has a value of less than 6.0 and 15–30% of the nickel or cobalt is in an acid extractable form, having a surface area of 150–210 m²/g, a Total Pore Volume (TPV) of 0.50–0.75 cc/g, and a pore size distribution such that less than 25% TPV is in pores having diameters less than 100 Å, 70.0–85.0% TPV is in pores having diameters of 100–160 Å and 1.0–15.0% TPV is in pores having diameters greater than 250 Å.

U.S. Pat. No. 5,399,259 (to Texaco as assignee of Dai, et al.) discloses a process for the hydrotreatment of a sulfur-, metals- and asphaltenes-containing feed which comprises contacting said feed with hydrogen and a catalyst in a manner such that the catalyst is maintained at isothermal conditions and is exposed to a uniform quality of feed, the catalyst comprising 3–6 wt % of an oxide of a Group VIII metal, 14.5–24 wt % of an oxide of a Group VIB metal and 0–6 wt % of an oxide of phosphorus on a porous alumina support, having a surface area of 165–230 m²/g and a Total Pore Volume (TPV) of 0.5–0.8 cc/g such that less than 5% of TPV is in pores with diameters less than about 80 Å, at least 65% of the pore volume in pores with diameters less than 250 Å is in pores with diameters ±20 Å of a Pore Mode of about 100–135 Å and 22–29% TPV is in pores having diameters of greater than 250 Å. The instant invention is distinguished from Dai et al. (U.S. Pat. No. 5,399,259) in that Dai et al. requires a relatively low Total Pore Volume of only 0.5–0.8 cc/g, whereas, the catalysts of the instant invention require much higher Total Pore Volumes of 0.82–0.98 cc/g.

In related copending U.S. application Ser. No. 08/425,971 (D# 92,030-C1-D1) which is a divisional of U.S. Pat. No. 5,435,908 (to Texaco as assignee of Nelson et al.) there is disclosed a hydrotreating process employing, as catalyst, a porous alumina support with pellet diameters of 0.032–0.038 inches bearing 2.5–6 w % of a Group VIII non-noble metal oxide, 13–24 w % of a Group VIB metal oxide, less than or equal to 2.5 w % of silicon oxide, typically about 1.9–2 w % of intentionally added silica oxide, and 0–2 w % of a phosphorus oxide, preferably less than about 0.2 w % of a phosphorus oxide, with no phosphorus-containing components intentionally added during the catalyst preparation, said catalyst having a Total Surface Area of 165–210 m²/g, a Total Pore Volume of 0.75–0.95 cc/g, and a Pore Diameter Distribution whereby 14–22% of the Total Pore Volume is present as macropores of diameter ≧1000 Å, 22–32% of the Total Pore Volume is present as pores of diameter ≧250 Å, 68–78% of the Total Pore Volume is present as pores of diameter ≦250 Å, 26–35% of the Total Pore Volume is present as mesopores of diameters ≧200 Å, 34–69% of the Total Pore Volume is present as secondary micropores of diameters 100–200 Å, 5–18% of the Total Pore Volume is present as primary micropores of diameter ≦100 Å, and ≧57% of the micropore volume (i.e., as defined in U.S. application Ser. No. 08/425,971 (D# 92,030-C1-D1) which is a divisional of U.S. Pat. No. 5,435,908, pore volume in pores with diameters ≦200 Å) is present as micropores of diameter ±20 Å about a pore mode by volume of 100–145 Å. The instant case employs as catalyst, a nominally pure, porous alumina support with pellet diameters of 0.032–0.044 inches, preferably 0.039–0.044 inches, bearing 2.2–6 w % of a Group VIII non-noble metal oxide, 7–24 w % of a Group VIB metal oxide, less than or equal to 0.5 w % of silicon oxide (e.g., silica: SiO), preferably less than or equal to 0.41 w % of silica, with no silicon containing components intentionally added during catalyst preparation, and 0–2 w % of a phosphorus oxide, preferably less than 0.2 w % of a phosphorus oxide, most preferably less than 0.1 w % of a phosphorus oxide, with no phosphorus-containing components intentionally added during the catalyst preparation, said catalyst having a Total Surface Area of 195–230 m²/g, a Total Pore Volume of 0.82–0.98 cc/g, and a Pore Diameter Distribution whereby 27.0–34.0% of the Total Pore Volume is present as macropores of diameter greater than 250 Å, 66.0–73.0% of the Total Pore Volume is present as micropores of diameter less than 250 Å, 55–64.5% of the micropore volume is present as micropores of diameter ±25 Å about a pore mode by volume of 110–130 Å, and less than or equal to 0.05 cc/g of micropore volume is present in micropores with diameters less than 80 Å. In the instant case, the catalysts have only 46.5–56.5% of the micropore volume in pores with diameters ≦200 Å present as micropores of diameter ±20 Å about a pore mode by volume (i.e., dV/dD MAX) of 110–130 Å.

None of the above-identified catalyst types in the art have been found to be effective for achieving all of the desired improved process needs. Early catalysts in the art addressed the need for improved hydrodesulfurization and/or hydrodemetallation as measured in the total liquid product.

One recent line of catalyst development, as typified by U.S. Pat. No. 5,397,456 and copending U.S. application Ser. No. 08/130,472 (D# 92,067), has been to develop hydroconversion catalysts for the improved hydroconversion of feedstocks components having a boiling point greater than 1000° F. to products having a boiling point less than 1000° F. The most recent developments of hydroconversion catalysts, as typified by U.S. application Ser. No. 08/130,472 (D# 92,067), have been to develop hydroconversion catalysts with slightly improved bottoms HDS activities and some slight degree of sediment control allowing the use of some higher temperatures. Although the above-described hydroconversion catalysts give improved levels of hydroconversion of feedstocks components having a boiling point greater than 1000° F. to products having a boiling point less than 1000° F., they do not give the desired levels of sulfur removal obtained from the below-described petroleum bottoms HDS catalysts and these hydroconversion catalysts still make some amount of sediment.

A second line of catalyst development, as typified by U.S. Pat. Nos. 4,941,964 and 5,047,142, has been to develop improved catalysts for petroleum bottoms HDS (i.e., selective sulfur removal from the unconverted hydrocarbon product having a boiling point greater than 1000° F. from a hydroprocess operating with significant hydroconversion of feedstocks components [e.g., petroleum resids] having a boiling point greater than 1000° F. to products having a boiling point less than 1000° F.). More recent developments of petroleum bottoms HDS catalysts, as typified by U.S. Pat. No. 5,399,259 and copending U.S. application Ser. No. 08/425,971 (D# 92,030-C1-D1) which is a divisional of U.S. Pat. No. 5,435,908, have been to develop petroleum bottoms HDS catalysts with some degree of sediment control allowing the use of some higher temperatures.

It would be desirable if a catalyst were available which provided improved hydrodesulfurization, particularly improved bottoms HDS, and no sediment make and which could also withstand operation at much higher temperatures, so that it would be possible to attain a much higher levels of hydroconversion without the undesirable formation of sediment. Undesirable low levels of hydroconversion represent a problem which is particularly acute for those refiners who operate vacuum resid hydroprocessing units at or near their sediment limit. Such refiners, in the absence of sediment, would raise temperature and thus hydroconversion levels. It would be most desirable to operate at high temperatures, high levels of hydroconversion and hydrodesulfurization, particularly high levels of bottoms hydrodesulfurization, and minimal sediment make.

It is an object of this invention to provide a process for hydroconverting a charge hydrocarbon feed, particularly, to hydroconvert feedstock components having boiling points greater than 1000° F. into products having boiling points less than 1000° F. while simultaneously removing high amounts of sulfur from the unconverted 1000° F.+ product stream. It is also an object of this invention to provide low Existent and Accelerated IP Sediment values in the 650° F.+ boiling point product (Discussed below under "Sediment Measurement"). It is also an object of this invention to allow the use of much higher operating temperatures to produce more highly hydroconverted product with improved, lower levels of sulfur, particularly lower levels of sulfur in the unconverted 1000° F.+ product stream, and minimal sediment. Other objects will be apparent to those skilled in the art.

STATEMENT OF THE INVENTION

In accordance with certain of its aspects, this invention is directed to a process for hydroprocessing a charge hydrocarbon feed containing components boiling above 1000° F., and sulfur, metals, and carbon residue which comprises contacting said charge hydrocarbon feed with hydrogen at isothermal hydroprocessing conditions in the presence of, as catalyst, a nominally pure, porous alumina support, bearing 2.2–6 w % of a Group VIII non-noble metal oxide, 7–24 w % of a Group VIB metal oxide, less than or equal to 0.5 w % of silicon oxide (e.g., silica: $SiO_2$), preferably less than or equal to 0.41 w % of silica, with no silicon containing components intentionally added during catalyst preparation and 0–2 w % of a phosphorus oxide, preferably less than 0.2 w % of a phosphorus oxide, most preferably less than 0.1 w % of a phosphorus oxide, with no phosphorus-containing components intentionally added during the catalyst preparation, said catalyst having a Total Surface Area of 195–230 $m^2/g$, a Total Pore Volume of 0.82–0.98 cc/g, and a Pore Diameter Distribution whereby 27.0–34.0% of the Total Pore Volume is present as macropores of diameter greater than 250 Å, 66.0–73.0% of the Total Pore Volume is present as micropores of diameter less than 250 Å, 55–64.5% of the micropore volume is present as micropores of diameter ±25 Å about a pore mode by volume (i.e., that micropore diameter where maximum mercury intrusion occurs: dV/dD MAX) of 110–130 Å, and less than or equal to 0.05 cc/g of micropore volume is present in micropores with diameters less than 80 Å, thereby forming hydroprocessed product containing decreased content of components boiling above 1000° F. and sulfur, metals, and carbon residue; and recovering said hydroprocessed product containing decreased content of components boiling above 1000° F., and of sulfur, metals, and carbon residue, recovering said hydroprocessed product containing decreased content of sulfur in the portion of the hydroprocessed product boiling above 1000° F., and recovering said hydroprocessed product containing decreased content of sediment in the portion of the hydroprocessed product boiling above 650° F.

The catalyst of the instant invention allows operation about +10° F. and about +5 wt % 1000° F. conversion compared to operations with a first generation H-OIL catalyst. The catalyst of the instant invention also allows operation at about +20° F. and about +13.5 wt % 1000° F. conversion compared to operations with a first generation H-OIL catalyst. This constitutes a substantial economic advantage.

DESCRIPTION OF THE INVENTION

Feedstock

The hydrocarbon feed which may be charged to the process of this invention may include heavy, high boiling petroleum cuts typified by gas oils, vacuum gas oils, petroleum cokes, residual oils, vacuum resids, etc. The process of this invention is particularly useful to treat high boiling oils which contain components boiling above 1000° F. to convert them to products boiling below 1000° F. The charge may be a petroleum fraction having an initial boiling point of above 650° F. characterized by presence of an undesirable high content of components boiling above 1000° F., and sulfur, carbon residue and metals; and such charge may be subjected to hydrodesulfurization (HDS). In particular, the charge may be undiluted vacuum resid.

A typical charge which may be utilized is an Arabian Medium/Heavy Vacuum Resid having the following properties:

TABLE I

| Property | Value |
|---|---|
| API Gravity | 4.8 |
| 1000° F.+, vol % | 87.5 |
| 1000° F.+, wt % | 88.5 |
| 1000° F.– wt % | 11.5 |
| Sulfur, wt % | 5.1 |
| Total Nitrogen, wppm | 4480 |
| Hydrogen, wt % | 10.27 |
| Carbon, wt % | 84.26 |
| Alcor MCR, wt % | 22.2 |
| Kinematic Viscosity, cSt | |
| @ 212° F. | 2430 |
| @ 250° F. | 410 |
| @ 300° F. | 117 |
| Pour Point, °F. | 110 |
| n-$C_5$ Insolubles, wt % | 28.4 |
| n-$C_7$ Insolubles, wt % | 9.96 |
| Toluene Insolubles, wt % | 0.02 |
| Asphaltenes, wt % | 9.94 |
| Metals, wppm | |
| Ni | 49 |
| V | 134 |
| Fe | 10 |
| Cu | 3 |
| Na | 49 |
| Total Metals wppm | 245 |
| Chloride, wppm | 28 |

It is a particular feature of the process of this invention that it may permit treating of hydrocarbon charge, particularly those containing components boiling above about 1000° F., to form product which is characterized by an increased content of components boiling below 1000° F. and by decreased content of undesirable components typmetals, sulfur, metals, and carbon residue. It is another feature of the process of the instant invention that it provides improved sulfur removal from the unconverted 1000° F. products. It is another feature of the process of the instant invention that it provides the above mentioned improvements with little or no sediment formation as measured by the Existent and Accelerated IP Sediment values of the 650° F.+ boiling point product. It is another feature of the process of the instant invention that it allows operations at higher temperatures with consequent higher levels of 1000° F.+ to 1000° F.− than may be achieved with the use of first generation catalysts.

Sediment Measurement

It is a particular feature of the catalyst of this invention that it permits operation to be carried out under conditions which yield a substantially decreased content of sediment in the product stream leaving hydrotreating.

The charge to a hydroconversion process is typically characterized by a very low sediment content of 0.01 weight percent (wt %) maximum. Sediment is typically measured by testing a sample by the Shell Hot Filtration Solids Test (SHFST). See Jour. Inst. Pet. (1951) 37 pages 596–604 Van Kerknoort et al. incorporated herein by reference. Typical hydroprocessing processes in the art commonly yield Shell Hot Filtration Solids of above about 0.17 wt % and as high as about 1 wt % in the 650° F.+ product recovered from the bottoms flash drum (BFD). Production of large amounts of sediment is undesirable in that it results in deposition in downstream units which in due course must be removed. This of course requires that the unit be shut down for an undesirable long period of time. Sediment is also undesirable in the products because it deposits on and inside various pieces of equipment downstream of the hydroprocessing unit and interferes with proper functioning of e.g. pumps, heat exchangers, fractionating towers, etc.

Very high levels of sediment formation (e.g., 1 wt %), however, are not usually experienced by those refiners who operate vacuum resid hydroprocessing units at moderate conversion levels of feedstock components having boiling points greater than 1000° F. into products having boiling points less than 1000° F. (say, 40–65 volume percent—vol %—conversion) and at relatively low but still undesirable values of sediment (e.g., a sediment limit of 0.17 wt %). Many refiners operate at this relatively low but still undesirable value of sediment in order to minimize the above-described equipment fouling. Such refiners, in the absence of sediment, would raise temperature and thus hydroconversion levels. It would be most desirable to operate at high temperatures, high levels of hydroconversion and hydrodesulfurization, particularly high levels of bottoms hydrodesulfurization, and minimal sediment make.

In the instant invention the IP 375/86 test method for the determination of total sediment has been very useful. The test method is described in ASTM Designation D 4870-92—incorporated herein by reference. The IP 375/86 method was designed for the determination of total sediment in residual fuels and is very suitable for the determination of total sediment in our 650° F.+ boiling point product. The 650° F.+ boiling point product can be directly tested for total sediment which is designated as the "Existent IP Sediment value." We have found that the Existent IP Sediment Test gives essentially equivalent test results as the Shell Hot Filtration Solids Test described above.

We have noted, however, that even 650° F.+ boiling point products which give low Existent IP Sediment values, may produce additional sediment upon storage. Thus, we have developed a more severe test for sediment. In this modified test, 50 grams of 650° F.+ boiling point product are heated to about 90° C. and mixed with about 5 milliliters of reagent grade hexadecane. The mixture is aged for about one hour at about 100° C. The resultant sediment is then measured by the IP 375/86 test method. The values obtained from this modified test are designated the "Accelerated IP Sediment values."

As it is recommended that the IP 375/86 test method be restricted to samples containing less than or equal to about 0.4 to 0.5 wt % sediment, we reduce sample size when high sediment values are observed. This leads to fairly reproducible values for even those samples with very large sediment contents.

It will be noted that catalysts of this invention, characterized by (i) about 0.12–0.20 cc/g of pores in the $\geq 1200$ Å range, (ii) about 17–27% of TPV in pores in the $\geq 600$ Å range, (iii) 27.0–34.0% of the TPV in pores having a diameter of $\geq 250$ Å, (iv) 66.0–73.0% of the TPV in micropores of diameter less than 250 Å, (v) 55–64.5% of the micropore volume is present as micropores of diameter ±25 Å about a pore mode by volume (i.e., that micropore diameter where maximum mercury intrusion occurs: dV/dD MAX) of 110–130 Å, (vi) 46.5–56.5% of the micropore volume in pores with diameters $\leq 200$ Å is present as micropores of diameter ±20 Å about a pore mode by volume (i.e., dV/dD MAX) of 110–130 Å, (vii) about 20–35% of the TPV in pores having a diameter of 55–115 Å, and (viii) less than 0.05 cc/g micropore volume in micropores with diameters less than 80 Å.—are particularly advantageous in that they permit attainment of product hydrocarbon streams containing the lowest content of sediment at highest conversion, while producing product characterized by low sulfur, carbon residue and metals contents.

It is a feature of the catalyst of this invention that it permits attainment of hydrotreated product with $\leq 0.17$ wt % sediment, as measured by the Existent IP Sediment test in the portion of the hydroprocessed product boiling above 650° F., typically as low as 0.02 wt % in operations at about +10° F. and about +5 wt% 1000° F. conversion compared to operations with a first generation H-OIL catalyst, and typically 0.17 wt % in operations at about +20° F. and about +13.5 wt % 1000° F. conversion compared to operations with a first generation H-OIL catalyst.

It is another feature of the catalyst of this invention that it permits attainment of hydrotreated product with $\leq 0.32$ wt % sediment, as measured by the Accelerated IP Sediment test in the portion of the hydroprocessed product boiling above 650° F., typically as low as 0.17 wt % in operations at about +10° F. and about +5 wt % 1000° F. conversion compared to operations with a first generation H-OIL catalyst, and typically 0.32 wt % in operations at about +20° F. and about +13.5 wt % 1000° F. conversion compared to operations with a first generation H-OIL catalyst.

Reaction Conditions

In the practice of the process of this invention (as typically conducted in a single-stage Robinson reactor in pilot plant operations), the charge hydrocarbon feed is contacted with hydrogen at isothermal hydrotreating conditions in the presence of catalyst. Pressure of operation may be 1500–10,000 psig, preferably 1800–2500 psig, say 2250 psig. Hydrogen is charged to the Robinson Reactor at a rate of 2000–10,000 SCFB, preferably 3000–8000, say 7000 SCFB. Liquid Hourly Space Velocity (LHSV) is typically 0.1–1.5, say 0.56 volumes of oil per hour per volume of liquid hold-up in the reactor. Temperature of operation is typically 700°–900° F., preferably 750°–875° F., say 760° F. Operation is essentially isothermal. The temperature may typically vary throughout the bed by less than about 20° F.

In another more preferred embodiment of the process of the instant invention, the liquid and gaseous effluent from the previously described first-stage Robinson reactor is routed to a second-stage Robinson reactor containing the same weight of catalyst as had been loaded to the first-stage Robinson reactor and which is operated at essentially the same temperature and pressure as the first-stage Robinson reactor. The difference in average temperature between the first- and second-stage reactors is 0° F.–30° F., preferably 0° F.–15° F., say 0° F. No additional hydrogen is normally injected to the second-stage Robinson reactor. The liquid effluent passes through the second-stage Robinson reactor at a similar LHSV to that of the first-stage Robinson reactor. The liquid effluent from the first-stage Robinson reactor is uniformly contacted with the hydrogen-containing gaseous effluent and the second loading of catalyst at isothermal conditions in the second-stage Robinson reactor. No attempt is made to maintain constant catalytic activity by periodic or continuous withdrawal of portions of used catalyst and replacement of the withdrawn material with fresh catalyst in the two-stage Robinson reactor system. The catalyst begins as fresh catalyst and accumulates catalyst age generally expressed in barrels per pound. The average temperature is defined as the average of the temperatures of the first- and second-stage reactors. Average temperature of operation is typically 700°–900° F., preferably 750°–875°0F, say 760° F. Overall, the hydrocarbon charge passes through the entire process system (i.e., the first- and second-stage Robinson reactors) at an overall LHSV of 0.05–0.75, say 0.28 volumes of oil per hour per volume of liquid hold-up in the reactor.

In general, reaction may be carried out in one or more continuously stirred tank reactors (CSTR's), such as Robinson reactors, in which the catalyst is exposed to a uniform quality of feed.

In one particularly preferred embodiment of the process of the instant invention, a sulfur-and metal-containing hydrocarbon feedstock is catalytically hydroprocessed using the H-OIL (TM) Process configuration. H-OIL is a proprietary ebullated bed process (co-owned by Hydrocarbon Research, Inc. and Texaco Development Corporation) for the catalytic hydrogenation of residua and heavy oils to produce upgraded distillate petroleum products and an unconverted bottoms product particularly suited for blending to a low sulfur fuel oil. The ebullated bed system operates under essentially isothermal conditions and allows for exposure of catalyst particles to a uniform quality of feed.

In the H-OIL Process, a catalyst is contacted with hydrogen and a sulfur- and metal-containing hydrocarbon feedstock by means which insures that the catalyst is maintained at essentially isothermal conditions and exposed to a uniform quality of feed. Preferred means for achieving such contact include contacting the feed with hydrogen and the catalyst in a single ebullated bed reactor, or in a series of 2–5 ebullated bed reactors, with a series of two ebullated bed reactors being particularly preferred. This hydroprocessing process is particularly effective in achieving high levels of hydrodesulfurization with vacuum residua feedstocks.

In the H-OIL Process, the hydrocarbon charge is admitted to the first-stage reactor of a two-stage ebullated bed H-OIL unit in the liquid phase at 650° F.–850° F., preferably 700° F.–825° F. and 1000–3500 psia, preferably 1500–3000 psia. Hydrogen gas is admitted to the first-stage reactor of a two-stage ebullated bed H-OIL unit in amount of 2000–10,000 SCFB, preferably 3000–8000 SCFB. The hydrocarbon charge passes through the first-stage ebullated bed reactor at a LHSV of 0.16–3.0 hr$^{-1}$, preferably 0.2–2 hr$^{-1}$. During operation, the catalyst bed is expanded to form an ebullated bed with a defined upper level. Operation is essentially isothermal with a typical maximum temperature difference between the inlet and outlet of 0° F.–50° F., preferably 0° F.–30° F. The liquid and gaseous effluent from the first-stage reactor is then routed to the second-stage reactor of the two-stage H-OIL unit which is operated at essentially the same temperature and pressure as the first-stage reactor. The difference in average temperature between the first- and second-stage reactors is 0° F.–30° F., preferably 0° F.–15° F. Some additional hydrogen may optionally be injected to the second-stage reactor to make up for the hydrogen consumed by reactions in the first-stage reactor.

In the H-OIL process, constant catalytic activity is maintained by periodic or continuous withdrawal of portions of used catalyst and replacement of the withdrawn material with fresh catalyst. Fresh catalyst is typically added at the rate of 0.05–1.0 pounds per barrel of fresh feed, preferably 0.20–0.40 pounds per barrel of fresh feed. An equal volume of used catalyst is withdrawn and discarded to maintain a constant inventory of catalyst on the volume basis. The catalyst replacement is performed such that equal amounts of fresh catalyst are added to the first-stage reactor and the second-stage reactor of a two-stage H-OIL unit.

Catalyst Support

The catalyst support may be alumina. Although the alumina may be alpha, beta, theta, or gamma alumina, gamma alumina is preferred.

The charge alumina which may be employed in practice of this invention may be available commercially from catalyst suppliers or it may be prepared by variety of processes typified by that wherein 85–90 parts of pseudoboehmite alumina is mixed with 10–15 parts of recycled fines. In preparing the instant catalyst, no silicon containing components, particularly silicon oxide (i.e., silica: SiO2), are intentionally added to the alumina, alumina support, impregnating solution or impregnating solutions. It is within the concept of this invention that during catalyst preparation, a small amount of silicon containing components may be unintentionally introduced as a contaminant, however, the finished catalyst is required to contain only ≦0.5 w % of silica, preferably less than or equal to 0.41 w % of silica.

Acid is added and the mixture is mulled and then extruded in an Auger type extruder through a die having cylindrical holes sized to yield a calcined substrate having a diameter of 0.032–0.044 inches, preferably 0.039–0.044 inches. Extrudate is air-dried to a final temperature of typically 250°–275° F. yielding extrudates with 20–25% of ignited solids. The air-dried extrudate is then calcined in an indirect fired kiln for 0.5–4 hours in an atmosphere of air and steam at typically about 1000° F.–1150° F.

Catalysts of the Instant Invention—Pore Size Distribution

The catalyst which may be employed is characterized by Total Surface Area (TSA), Total Pore Volume (TPV), and (Pore Diameter Distribution (Pore Size Distribution PSD). The Total Surface Area is 195–230 m$^2$/g, preferably 200–225 m$^2$/g, say 209 m$^2$/g. The total Pore Volume (TPV) may be 0.82–0.98, preferably 0.82–0.90, say 0.84 cc/g.

Less than 0.05 cc/g of micropore volume is present in micropores with diameters less than 80 Å.

Micropores of diameter in the range of less than 250 Å are present in an amount of about 66.0–73.0% of the Total Pore Volume, say 70.8% TPV. 55–64.5% of the micropore volume is present as micropores of diameter ±25 Å about a pore mode by volume (i.e., dV/dD MAX) of 110–130 Å. 46.5–56.5% of the micropore volume in pores with diameters ≦200 Å is present as micropores of diameter ±20 Å about a pore mode by volume (i.e., dV/dD MAX) of 110–130 Å.

The amount of Total Pore Volume in the range of 55–115 Å is only about 20–35% and preferably 28.9%.

The Pore Size Distribution is such that 27.0–34.0% of the Total Pore Volume, and preferably about 29.2% is present as macropores of diameter greater than 250 Å.

The amount of Total Pore Volume in pores with a diameter greater than 600 Å is only about 17–27% and preferably 20.9% TPV.

The amount of Total pore Volume in pores having a diameter greater than 1200 Å is only about 0.12–0.20 cc/g and preferably 0.14 cc/g.

It should be noted that the percentages of the pores in the finished catalyst are essentially the same as in the charge gamma alumina substrate from which it is prepared—although the Total Surface Area of the finished catalyst may be 75–85%, say 81.3% of the charge gamma alumina substrate from which it is prepared (i.e., 75–85% of a support surface area of 229°–307 m²/g, say 257 m²/g). It should also be noted that the Median Pore Diameter by Surface Area from mercury porosimetry of the finished catalyst is essentially the same as that of the charge gamma alumina substrate from which it is prepared.

It is also noted that the Pore Size Distribution (percent of total) in the finished catalyst may be essentially the same as in the charge alumina from which it is prepared (unless the majority of the pore volume distribution in a given range is near a "break-point"—e.g. 80° Å or 250 Å, in which case a small change in the amount of pores of a stated size could modify the reported value of the pore volume falling in a reported range). The Total Pore Volume, of the finished catalyst may be 75%–98%, say 81.3% of the charge alumina from which it is prepared.

Catalysts of the Instant Invention—Metals Loadings

The alumina charge extrudates may be loaded with metals to yield a product catalyst containing a Group VIII non-noble oxide in amount of 2.2–6 wt %, preferably 3.0–3.9 wt %, say 3.6 wt % and a Group VIB metal oxide in amount of 7–24 wt %, preferably 12.5–15.5 wt %, say 15.1 wt %.

The Group VIII metal may be a non-noble metal such as iron, cobalt, or nickel. This metal may be loaded onto the alumina typically from a 10%–30%, say 15% aqueous solution of a water-soluble salt (e.g. a nitrate, acetate, oxalate etc.). The preferred metal is nickel, employed as about a 12.3 wt % aqueous solution of nickel nitrate hexahydrate $Ni(NO_3)_2 \cdot 6H_2O$.

The Group VIB metal can be chromium, molybdenum, or tungsten. This metal may be loaded onto the alumina typically from a 10%–40%, say 20% aqueous solution of a water-soluble salt. The preferred metal is molybdenum, employed as about a 16.3 wt % aqueous solution of ammonium molybdate tetrahydrate $(NH_4)_6Mo_7O_{24} \cdot 4H_2O$. The molybdenum is supported on the alumina support in such a manner that the molybdenum gradient of the catalyst has a value of less than 5.0, discussed herein.

It is a feature of the catalyst of the invention that it contains 0–2 w % of a phosphorus oxide, preferably less than 0.2 w % of a phosphorus oxide, most preferably less than 0.1 w % of a phosphorus oxide, with no phosphorus-containing components intentionally added during the catalyst preparation.

As described above, no silicon containing components, particularly silicon oxide (i.e., silica: SiO2), are intentionally added to the alumina, alumina support, impregnating solution or impregnating solutions, however, silica may be present in very small amounts, typically up to 0.5 w % of silica, preferably less than or equal to 0.41 w % of silica.

These catalyst metals are impregnated onto the preferably pure alumina support according to the procedures described in U.S. Pat. No. 5,047,142, incorporated herein by reference in its entirety.

A necessary and essential feature of the catalyst composition of the instant invention is that 10–40% of the Group VIII metal present in the catalyst (with nickel preferably being the sole Group VIII metal) be acid extractable. The amount of acid extractable Group VIII metal in the catalyst (with nickel preferably being the sole Group VIII metal) is preferably in the range of 15–40%, most preferably 25–35% of the total Group VIII metal present in the catalyst. It is believed that the final calcination temperature during preparation of the catalyst determines the percentage of free Group VIII metal oxide (which is acid extractable) in the total catalyst composition (Also see U.S. Pat. No. 4,652,545, incorporated herein by reference in its entirety).

Another feature of the catalyst composition of the instant invention is that the ratio of the measured hydrodesulfurization (HDS) microactivity rate constant k of the catalyst of the instant invention to the measured HDS microactivity rate constant k of a standard hydroprocessing catalyst (namely, Criterion HDS-1443B, a commercially available, state-of-the-art catalyst for use in hydroprocessing resid oils), has a value of $\geq 0.5$, preferably $\geq 1.03$, most preferably $\geq 1.5$. As used in this description, the phrase "HDS microactivity" means the intrinsic hydrodesulfurization activity of a catalyst in the absence of diffusion, as measured according to the HDS Microactivity (HDS-MAT) Test, described as follows. In the HDS-MAT Test, a given catalyst is ground to a 30–60 mesh fraction and presulfided at 750° F. with a gas stream containing 10% $H_2S$/90% $H_2$. The catalyst is then exposed to a sulfur-containing feed, namely benzothiophene, which acts as a model sulfur compound probe, at reaction temperature and with flowing hydrogen for approximately 4 hours. Samples are taken periodically and analyzed by gas chromatography for the conversion of benzothiophene to ethylbenzene, thereby indicating the hydrodesulfurization properties of the catalyst being tested. The activity is calculated on both a catalyst weight and catalyst volume basis to account for any density differences between catalysts. The conditions for a typical HDS-MAT Test are as follows:

| | |
|---|---|
| Temperature: | about 550° F. |
| Pressure: | about atmospheric |
| Feedstock: | about 0.857 molar Benzothiophene in reagent grade normal heptane |
| Space Velocity: | 4 hr$^{-1}$ |
| Catalyst Charge: | 0.5 gram |

The kinetics of the reactor used in the HDS-MAT Test are first order, plug flow. At the above stated temperature and space velocity, the rate constant, k, may be expressed as $$k = ln(1/1\text{-}HDS)$$

where HDS is the fractional hydrodesulfurization value obtained for a given catalyst at the above stated conditions. A commercially available, state-of-the-art catalyst sold for use in hydroprocessing resid oils (Criterion HDS-1443B catalyst) was evaluated with the HDS-MAT Test under the above stated conditions and was found to have a %HDS value of 73% on a weight basis and a corresponding rate constant k value of 1.3093. Additional details of the HDS-MAT Test can be found in U.S. Pat. No. 5,047,142 to Texaco as assignee of Dai et al., supra, incorporated herein by reference. The catalysts of the instant invention require that the ratio of the measured HDS-MAT rate constant k, relative to that obtained with Criterion HDS-1443B, have values of preferably $\geq 1.03$, most preferably $\geq 1.5$: the catalysts of U.S. Pat. No. 5,047,142 are required to have values >1.0, preferably >1.5.

It is another feature of the catalyst composition of the instant invention that the oxide of molybdenum, preferably MoO$_3$, is distributed on the above described porous alumina support in such a manner that the molybdenum gradient is <5. As used in this description, the phrase "molybdenum gradient" means the ratio of molybdenum/aluminum atomic ratio observed on the exterior surfaces of catalyst pellets relative to the molybdenum/aluminum atomic ratio observed on surfaces of a sample of the same catalyst which has been ground to a fine powder, the atomic ratios being measured by X-Ray photoelectron spectroscopy (XPS), sometimes referred to as Electron Spectroscopy for Chemical Analysis (ESCA). It is theorized that the molybdenum gradient is strongly affected by the impregnation of molybdenum on the catalyst support and the subsequent drying of the catalyst during its preparation. ESCA data were obtained on an ESCALAB MKII instrument available from V. G. Scientific Ltd., which uses a 1253.6 electron volt magnesium X-Ray source. Additional details of the determination of molybdenum gradient can be found in U.S. Pat. No. 5,047,142 to Texaco as assignee of Dai et al., supra, incorporated herein by reference.

In the following Table II, the catalyst of Example I was prepared by using an alumina support prepared without silica and then impregnating/finishing with a low final calcination temperature. Examples II and III were made in commercial equipment by the same formula as Example I. Examples I–III are the most preferred catalysts of the instant invention. Example IV was made by the same formula as Example I but in this instance, the catalyst was finished with a somewhat higher calcination temperature designed to meet the minimum HDS-MAT requirements (C 0.5 g @ 555° F. and Relative k values) and the minimum nickel extraction requirements (wt % acid extractable nickel). Example IV is a preferred catalyst of the instant invention. Examples V and VI were made by the same formula as Example I but the catalysts were finished at high calcination temperature. Examples V and VI are less preferred catalysts of the instant invention. Example VII* is a catalyst with similar catalytic metals loadings but which does contain silica (i.e., as in U.S. application Ser. No. 08/425,971 which is a divisional of U.S. Pat. No. 5,435,908).

TABLE II

Texaco R&D-PA Analyses of Catalyst Samples*

| | Instant Invention | | Instant Invention—Preferred Types | | | | Instant Invention Less Preferred Types | | |
|---|---|---|---|---|---|---|---|---|---|
| | Broad Ranges | Preferred Ranges | Example I | Example II | Example III | Example IV | Example V | Example VI | Ex. VII* |
| Metals | | | | | | | | | |
| Molybdenum (as MoO$_3$) | 7–24 | 12.5–15.5 | 15.1 | 15.1 | 15.3 | NA | (15.3) | 14.4 | (14.0) |
| Nickel (as NiO) | 2.2–6 | 3.0–3.9 | 3.6 | 3.6 | 3.5 | NA | (3.4) | 3.3 | (3.1) |
| Silicon (as SiO$_2$) | ≦0.5 (None added) | ≦0.41 (None added) | 0.41 | 0.24 | 0.26 | NA | NA | 0.17 | (2.1) |
| Phosphorus (as P$_2$O$_5$) | ≦0.2 (None added) | ≦0.2 (None added) Most preferably <0.1 | <0.02 | 0.09 | <0.02 | NA | NA | <0.02 | (0.0) |
| Surface Area (N$_2$, BET) m$^2$/g | 195–230 | 200–225 | 209 | 212 | 215 | 205 | 207 | 224 | 199 |
| Pore Size Distribution (Hg)** | | | | | | | | | |
| TPV cc/g | 0.82–0.98 | 0.82–0.90 | 0.84 | 0.87 | 0.86 | 0.87 | 0.88 | 0.95 | 0.87 |
| PV, c/g >1200 Å | ~0.12–0.20 | ~0.12–0.20 | 0.14 | 0.17 | 0.18 | 0.12 | 0.16 | 0.15 | 0.15 |
| PV, cc/g >600 Å % of TPV | ~17–27 | ~17–27 | 20.9 | 23.1 | 23.8 | 18.2 | 21.5 | 20.1 | 22.0 |
| PV, cc/g >250 Å % of TPV | 27.0–34.0 | 27.0–34.0 | 29.2 | 29.7 | 29.7 | 27.1 | 30.3 | 28.5 | 29.6 |
| PV, cc/g <80 Å | <0.05 | <0.05 | 0.02 | 0–.02 | 0.03 | 0.01 | 0.01 | 0.02 | 0.03 |
| Pore Mode (dV/dD MAX from Hg) | 110–130 | 110–130 | 111 | 111 | 116 | 116 | 111 | 111 | 116 |
| PV, ±25 Å from dV/dD MAX, % of PV <250 Å | 55–64.5 | 55–64.5 | 60.2 | 61.9 | 57.0 | 58.3 | 58.4 | 60.8 | 65.6 |
| PV, ±20 Å from dV/dD MAX, % of PV <200 Å | 46.5–56.5 | 49–56.1 | 54.8 | 56.1 | 49.9 | 53.6 | 54.2 | 55.9 | 69.2 |
| PV, cc/g 55–115 Å % of TPV | ~20–35 | ~20–35 | 28.9 | 30.3 | 26.0 | 22.0 | 23.5 | 28.9 | 23.7 |
| PV, cc/g >1000 Å % of TPV | ~14–22 | ~14–22 | 18.1 | 20.7 | 21.7 | 15.2 | 18.5 | 16.9 | 18.9 |
| Median Pore Diameter (by Surface Area from Hg), Å | ~115–130 | ~115–130 | 116 | 115 | 118 | 124 | 122 | 120 | 120 |
| Impregnation Characteristics | | | | | | | | | |
| HDS-MAT C 0.5 g @ 550° F. | ≧49 | ≧74 | 91 | 90 | 88.5 | 74 | 68 | 54 | 62 |
| HDS-MAT, Relative k*** | ≧0.5 | ≧1.03 most preferably ≧1.5 | 1.84 | 1.76 | 1.65 | 1.03 | 0.87 | 0.59 | 0.74 |
| Nickel Extraction, wt % | 10–40 | 15–40 most preferably 25–35 | (30.0) | (30.2) | (28.0) | (15.2) | (13.6) | (12) | (13.0) |
| ESCA Molybdenum Gradient | <5 | <5 | 1.6 | 3.2 | 2.1 | 1.4 | 1.4 | 1.5 | 2.8 |
| Average Pellet Diameter, Inches | 0.032–0.044 | 0.039–0.044 | 0.041 | 0.043 | 0.044 | 0.039 | 0.040 | 0.043 | 0.040 |

*Values in parentheses obtained at Cytec Industries Stamford Research Laboratories.
**Contact angle = 130°; surface tension = 484 dynes/cm.
***As described in U.S. Pat. No. 5,047,142.

In the following Table III, the broad ranges for the catalysts of this invention and the preferred ranges for the catalysts of this invention are listed (including: Total Pore Volume in cc/g; Pore Volume occupied by pores falling in designated ranges—as a volume % of Total Pore Volume (%TPV) or as a volume % of the Pore Volume in micropores with diameters less than 250 Å -i.e., % of Pore Volume in the micropores- or in cc of Pore Volume per gram of catalyst; Pore Mode by volume from mercury porosimetry (dV/dD MAX); Pore Volume falling with ±25 Å of dV/dD MAX in the less than 250 Å region; and, Surface Area in m$^2$/g). The remaining columns list properties and references for other hydroprocessing catalysts in the art.

Preferred Embodiment

In practice of the process of this invention, the catalyst, preferably in the form of extruded cylinders of 0.039–0.044 inch diameter and about 0.15 inch length may be placed within the first- and second-stage reactors of a two-stage H-OIL Unit. The hydrocarbon charge is admitted to the lower portion of the first-stage reactor bed in the liquid phase at 650° F.–850° F., preferably 700° F.–825° F. and 1000–3500 psia, preferably 1500–3000 psia. Hydrogen gas is admitted to the first-stage reactor of the two-stage ebullated bed H-OIL unit in amount of 2000–10,000 SCFB, preferably 3000–8000 SCFB. The hydrocarbon charge passes through the first-stage ebullated bed reactor at a

TABLE III

|  | Instant Invention | | Selected | U.S. Pat. No. / |
| --- | --- | --- | --- | --- |
|  | Broad Ranges | Preferred Ranges | Art Ranges | application Ser. No. Reference |
| Metals |  |  |  |  |
| Molybdenum (as MoO$_3$) | 7–24 | 12.5–15.5 |  |  |
| Nickel (as NiO) | 2.2–6 | 3.0–3.9 |  |  |
| Silicon (as SiO$_2$) | ≤0.5 (None added) | ≤0.41 (None added) | ≤2.5; typically 1.9–2.0 | 5,445,908; 08/425,971 |
| Phosphorus (as P$_2$O$_5$) | ≤0.2 (None added) | ≤0.2 (None added) Most preferably <0.1 | <0.2 | 5,445,908; 08/425,971 |
| Surface Area (N$_2$, BET) m$^2$/g | 195–230 | 200–225 | 140–190 | 4,395,328 |
|  |  |  | 240–310 | 5,397,456 |
| Pore Size Distribution (Hg)** |  |  |  |  |
| TPV cc/g | 0.82–0.98 | 0.82–0.90 | 0.4–0.65 | 4,089,774 |
|  |  |  | 0.5–0.75 | 4,941,964 |
|  |  |  | 0.5–0.75 | 5,047,142 |
|  |  |  | 0.5–0.75 | 5,397,456 |
|  |  |  | 0.5–0.8 | 5,399,259 |
| PV, cc/g >1200 Å | ~0.12–0.20 | ~0.12–0.20 | 0.23–0.31 | 5,221,656 |
| PV, cc/g >600 Å % of TPV | ~17–27 | ~17–27 | 35–55 | 4,395,329 |
| PV, cc/g >250 Å % of TPV | 27.0–34.0 | 27.0–34.0 | 5.5–22.0 | 4,941,964 |
|  |  |  | 1.0–15.0 | 5,047,142 |
|  |  |  | 11–18 | 5,397,456 |
| PV, cc/g <80 Å | <0.05 | <0.05 |  |  |
| Pore Mode (dV/dD MAX from Hg) | 110–130 | 110–130 | 40–100 | 5,221,656 |
| PV, ±25 Å from dV/dD MAX, % of PV <250 Å | 55–64.5 | 55–64.5 | ≧65 | 5,399,259 |
| PV, ±20 Å from dV/dD MAX, % of PV <200 Å | 46.5–56.5 | 49–56.1 | ≧57 | 5,445,908; 08/425,971 |
| PV, cc/g 55–115 Å % of TPV | ~20–35 | ~20–35 | 63–78 | 5,397,456 |
|  |  |  | 50–62.8 | 08/130,472 |
| PV, cc/g >1000 Å % of TPV | ~14–22 | ~14–22 | 14–22 | 5,445,908; 08/425,971 |
| Median Pore Diameter (by Surface Area from Hg), Å | ~115–130 | ~115–130 |  |  |
| Impregnation Characteristics |  |  |  |  |
| HDS-MAT C 0.5 g @ 550° F. | ≧49 | ≧74 |  |  |
| HDS-MAT, Relative k*** | ≧0.5 | ≧1.03 most preferably ≧1.5 |  |  |
| Nickel Extraction, wt % | 10–40 | 15–40 most preferably 25–35 | 15–30 | 5,047,142 |
| ESCA Molybdenum Gradient | <5 | <5 |  |  |
| Average Pellet Diameter, Inches | 0.032–0.044 | 0.039–0.044 | 0.032–0.038 | 5,445,908; 08/425,971 |

*Values in parentheses obtained at Cytoc Industries Stamford Research Laboratories.
**Contact angle = 130°; surface tension = 484 dynes/cm.
***As described in U.S. Pat. No. 5,047,142.

The catalyst may be evaluated in a two-stage Robinson Reactor, a Continuously Stirred Tank Reactor (CSTR) which evaluates catalyst deactivation at conditions simulating those of a two-stage H-OIL ebullated bed Unit. The feedstock is an Arabian Medium/Heavy Vacuum Resid of the type set forth above. Evaluation is carried out for six or more weeks to a catalyst age of 2.73 or more barrels per pound.

LHSV of 0.16–3.0 hr$^{-1}$, preferably 0.2–2 hr$^{-1}$. During operation, the first-stage reactor catalyst bed is expanded to form an ebullated bed with a defined upper level. Operation is essentially isothermal with a typical maximum temperature difference between the inlet and outlet of 0° F.–50° F., preferably 0° F.–30° F. The liquid and gaseous effluent from the first-stage reactor is admitted to the lower portion of the second-stage reactor of the two-stage H-OIL unit which is operated at essentially the same temperature and pressure as the first-stage reactor. The difference in average temperature between the first- and second-stage reactors is 0° F.–30° F., preferably 0° F.–15° F. Some additional hydrogen may optionally be injected to the second-stage reactor to make up for the hydrogen consumed by reactions in the first-stage reactor. During operation, the second-stage reactor catalyst bed is also expanded to form an ebullated bed with a defined upper level. Constant catalytic activity is maintained by periodic or continuous withdrawal of portions of used catalyst and replacement of the withdrawn material with fresh catalyst. Fresh catalyst is typically added at the rate of 0.05–1.0 pounds per barrel of fresh feed, preferably 0.20–0.40 pounds per barrel of fresh feed. An equal volume of used catalyst is withdrawn and discarded to maintain a constant inventory of catalyst on the volume basis. The catalyst replacement is performed such that equal amounts of fresh catalyst are added to the first-stage reactor and the second-stage reactor of a two-stage H-OIL unit.

In a less preferred embodiment, the reaction may be carried out in one or more continuously stirred tank reactors (CSTR) which also provides essentially isothermal conditions.

During passage through the reactor, preferably containing an ebullated bed, the hydrocarbon feedstock is converted to lower boiling products by the hydrotreating/hydrocracking reaction.

Practice of the Instant Invention

In a typical embodiment, employing a two-stage Robinson reactor pilot Unit, a charge containing 60 wt %–95 wt %, say 88.5 wt % boiling above 1000° F. may be converted to a hydrotreated product containing only 32 wt %–50 wt %, say 47.0 wt % boiling above 1000° F. The sulfur of the original charge is 3–7 wt %, typically 5.1 wt %; the sulfur content of the unconverted 1000° F.+ component in the product is 0.5–3.5 wt %, typically 1.8 wt %. In another embodiment, employing a two-stage Robinson reactor pilot Unit operating at +10° F. over normal operating temperatures and at a larger value of catalyst age, a charge containing 60 wt %–95 wt %, say 88.5 wt % boiling above 1000° F. may be converted to a hydrotreated product containing only 26 wt %–41 wt %, say 38.5 wt % boiling above 1000° F. The sulfur content of the unconverted 1000° F.+ component in the product is 0.5–3.5 wt %, typically 2.1 wt %. In both embodiments, the Existent IP sediment values of the 650° F.+ product leaving the reactor are extremely small; ≦0.02 wt %. In both embodiments, the Accelerated IP sediment values are relatively small; ≦0.17 wt %.

In another embodiment, employing a two-stage Robinson reactor pilot Unit operating at +20° F. over normal operating temperatures and at a larger value of catalyst age, a charge containing 60 wt %–95 wt %, say 88.5 wt % boiling above 1000° F. may be converted to a hydrotreated product containing only 21 wt %–32 wt %, say 30.3 wt % boiling above 1000° F. The sulfur content of the unconverted 1000° F.+ component in the product is 0.5–3.5 wt %, typically 2.3 wt %. In this embodiment, the Existent IP sediment value of the 650° F.+ product leaving the reactor is high (i.e., 0.17 wt %). This Existent IP sedimentation level, however, is similar to that experienced with first generation catalysts at normal operating temperatures and lower (i.e., –13.5 wt %) hydroconversion of feedstock components having a boiling point greater than 1000° F. to products having a boiling point less than 1000° F. The Accelerated IP sediment value of the 650° F.+ product leaving the reactor is still relatively low (i.e., 0.32 wt %). This Accelerated IP sedimentation level is only about 44% of that experienced with first generation catalysts at normal operating temperatures and lower (i.e., –13.5 wt %) hydroconversion of feedstock components having a boiling point greater than 1000° F. to products having a boiling point less than 1000° F.

ADVANTAGES OF THE INVENTION

It will be apparent to those skilled in the art that this invention is characterized by advantages including the following:

(i) It gives no sediment versus an undesirable level with a commercially available first generation nickel/molybdenum H-OIL catalyst when both catalysts are compared at normal operating temperatures;

(ii) It allows an increase in reaction temperature and thus allows operations at higher (i.e., up to 66.2) wt % 1000° F.+ to 1000° F.– conversion levels;

(iii) It permits improved levels of carbon residue reduction and nickel and vanadium removal at all (i.e., 46.9–66.2) wt % 1000° F.+ to 1000° F.– conversion levels; and, (iv) It permits an improved level of sulfur removal as seen in the observed hydrodesulfurization (HDS) of the total liquid product and the substantially improved, lower level of sulfur in the unconverted 1000° F. stream at all (i.e., 46.9–66.2) wt % 1000° F.+ to 1000° F.– conversion levels.

Practice of the process of this invention will be apparent to those skilled in the art from the following wherein all parts are parts by weight unless otherwise stated.

DESCRIPTION OF SPECIFIC EMBODIMENTS

Best Known Mode Reactor Data

Equal amounts of Example I catalyst are placed within the reaction vessels (the first-stage and second-stage Robinson Reactors). The hydrocarbon charge (i.e., the undiluted Arabian Medium/Heavy vacuum resid, described in Table I, supra) is admitted in liquid phase to the first-stage Robinson reactor at 760° F. and 2250 psig. Hydrogen gas is admitted to the first-stage Robinson reactor in the amount of 7000 SCFB. The hydrocarbon charge passes through the first-stage Robinson reactor at a Liquid Hourly Space Velocity (LHSV) of 0.56 volumes of oil per hour per volume of liquid hold up. This is equivalent to a Catalyst Space Velocity (CSV) of 0.130 barrels of hydrocarbon charge per pound of catalyst per day. The hydrocarbon feed is uniformly contacted with hydrogen and catalyst at isothermal conditions in the first-stage Robinson reactor. The liquid and gaseous effluent from the first-stage Robinson reactor is then routed to the second-stage Robinson reactor which is operated at essentially the same temperature and pressure as the first-stage Robinson reactor. The difference in average temperature between the first- and second-stage reactors is nominally 0° F. No additional hydrogen is injected to the second-stage Robinson reactor. The liquid effluent passes through the second-stage Robinson reactor at a Liquid Hourly Space Velocity (LHSV) of 0.56 volumes of liquid effluent per hour per volume of liquid hold up. This is equivalent to a Catalyst Space Velocity (CSV) of 0.130 barrels of liquid effluent per pound of catalyst per day. The liquid effluent from the first-stage Robinson reactor is uniformly contacted with the hydrogen-containing gaseous effluent and the second loading of catalyst at isothermal conditions in the second-stage Robinson reactor. No attempt is made to maintain constant catalytic activity by periodic or continuous withdrawal of portions of used catalyst and replacement of the withdrawn material with fresh catalyst in the two-stage Robinson reactor system. The catalyst begins as fresh catalyst and accumulates catalyst age generally expressed in barrels per pound. The average temperature is defined as the average of the temperatures of the first- and second-stage reactors.

Overall, the hydrocarbon charge passes through the entire process system (i.e., the first- and second-stage Robinson reactors) at an overall LHSV of 0.28 volumes of oil per hour per volume of liquid hold up. This is equivalent to an overall CSV of 0.065 barrels of hydrocarbon charge per pound of catalyst per day. As will be discussed below, the temperatures of the first- and second-stage reactors may be raised to higher levels with the catalyst of the instant invention.

Product is collected and analyzed over a range of catalyst age of 0.60 through 1.18 barrels per pound (corresponding approximately to the 9th through 18th days of the evaluation) to yield the following averaged data:

TABLE IV

| Property | Value |
|---|---|
| % Sulfur Removal | 78.0 |
| % Carbon Residue Reduction | 58.0 |
| % Ni Removal | 71.0 |
| % V Removal | 95.0 |
| % Hydroconversion of 1000° F.+ to 1000° F. - Materials (wt % Basis) | 46.9 |
| % Kinetically Adjusted Hydroconversion (to 0.0650 bbl/lb/day and 760.0° F.) of 1000° F.+ to 1000° F. - Materials - wt % Basis) | 46.8 |

From the above Table IV, it is apparent that the process of the instant invention permits increasing the conversion of materials boiling above 1000° F. by 46.9 wt %; and sulfur, carbon residue, and metals are removed.

Upon distillation to recover (i) a first cut from the initial boiling point to 650° F., (ii) a second cut from 650° F. to 1000° F., and (iii) a third cut above 1000° F., the following is noted:

TABLE V

|  | Product |
|---|---|
| Cut 1: up to 650° F. | |
| Specific gravity, g/cc | 0.84 |
| Sulfur, wt % | 0.1 |
| Cut 2: 650° F.–1000° F. | |
| Specific Gravity, g/cc | 0.93 |
| Sulfur, wt % | 0.6 |
| Cut 3: 1000° F.+ | |
| Specific Gravity, g/cc | 1.02 |
| Sulfur, wt % | 1.8 |

From the above Table V, it is apparent that the Sulfur content is decreased in all of the product fractions (from 5.1 wt % in the feed).

Upon distillation to recover (iv) a cut which boils at temperatures of about 650° F. and higher, the following is noted:

TABLE VI

|  | Product |
|---|---|
| Cut 4: 650° F.+ | |
| Existent IP Sediment, wt % | 0.01 |
| Accelerated IP Sediment, wt % | 0.01 |

From the above Table, it is apparent that the process of the instant invention can operate at about 46.9% conversion of feed components with boiling points greater than 1000° F. to products with boiling points less than 1000° F. without making any sediment (as measured by both the Existent and Accelerated IP sediment tests).

EXAMPLE A

COMPARISON TO FIRST GENERATION CATALYST

Comparative data between the Example I catalyst of the instant invention and a first generation nickel/molybdenum H-OIL catalyst (Criterion HDS-1443B), collected under virtually identical reactor conditions, are given in Table VII. The process of the instant invention is superior in that it gives:

(i) No sediment versus an undesirable level with a commercially available first generation nickel/molybdenum H-OIL catalyst (as measured by both the Existent and Accelerated IP sediment tests);

(ii) Improved levels of carbon residue reduction and nickel and vanadium removal; and, (iii) An improved level of sulfur removal as seen in the observed hydrodesulfurization (HDS) of the total liquid product and the substantially improved, lower level of sulfur in the unconverted 1000° F. stream.

It is noted that a lower level of 1000° F.+ to 1000° F.– wt % conversion is obtained with the catalyst of the instant invention even once the data from both catalysts are kinetically adjusted to the target CSV and temperature at catalyst ages of 0.60 through 1.18 barrels per pound.

TABLE VII

EXAMPLE A
Two-Stage Robinson Reactor Catalyst Test Results
Single-Pass, Pure Resid, No Diluent, Once Through Hydrogen
Age = 0.60 to 1.18 Barrels Per Pound

| Catalyst | Example I | 1st Generation (HDS-1443B*) |
|---|---|---|
| CSV (Bbl/Lb/Day) | 0.066 | 0.064 |
| Temperature (°F.) (Average both stages) | 760.5 | 760.8 |
| Cut 4: (650° F.+) | | |
| Existent IP Sediment (wt %) | 0.01 | 0.16 |
| Accelerated IP Sediment (wt %) | 0.01 | 0.67 |
| Total Liquid Product | | |
| % Sulfur Removal | 78 | 76 |
| % Carbon Residue Reduction | 58 | 53 |
| % Nickel Removal | 71 | 64 |
| % Vanadium Removal | 95 | 90 |
| % Hydroconversion of 1000° F.+ to 1000° F.– Materials (wt %) | 46.9 | 52.9 |
| Kinetically Adjusted (CSV and T) % Hydroconversion of 1000° F.+ to 1000° F.– Materials (wt %) | 46.8 | 51.5 |
| Cut 1: up to 650° F. | | |
| Specific Gravity (g/cc) | 0.84 | 0.84 |
| Sulfur (wt %) | 0.1 | 0.1 |
| Cut 2: 650° F.– 1000° F. | | |
| Specific Gravity (g/cc) | 0.93 | 0.93 |
| Sulfur (wt %) | 0.6 | 0.7 |
| Cut 3: 1000° F.+ | | |
| Specific Gravity (g/cc) | 1.02 | 1.03 |
| Sulfur (wt %) | 1.8 | 2.2 |

*Criterion HDS-1443B H-OIL catalyst.
**1st order CSTR kinetics (assuming equal rate constants for the 1st- and 2nd- stage reactors); Activation Energy = 65 kcal/mole.

EXAMPLE B

DATA AT +10° F.

In the evaluation of the Example I catalyst of the instant invention, reactor temperatures were raised about 10° F.

over a period of 2.0 days to a final temperature of approximately 770° F. (i.e., the first-stage, second-stage, and average temperatures). Product was collected and analyzed over a range of catalyst age of 1.57 through 2.16 barrels per pound (corresponding approximately to the 24th through 33rd days of the evaluation). Comparative data between the catalyst of the instant invention operating at about +10° F. compared to the first generation nickel/molybdenum H-OIL catalyst (Criterion HDS-1443B) at the same catalyst ages are given in Table VIII. The process of the instant invention is superior in that it gives:

(i) Low Existent IP sediment at 57 wt % 1000° F.+ to 1000° F.– conversion versus an undesirable level with the first generation nickel/molybdenum H-OIL catalyst operating at only 53 wt % 1000° F.+ to 1000° F.– conversion;

(ii) Relatively low Accelerated IP sediment at 57 wt % 1000° F.+ to 1000° F.– conversion versus a very high level with the first generation nickel/molybdenum H-OIL catalyst operating at only 53 wt % 1000° F.+ to 1000° F.– conversion;

(iii) An improved level of 1000° F.+ to 1000° F.– wt % conversion by the observed data and once the data from both catalysts are kinetically adjusted to the target CSV;

(iv) Improved levels of carbon residue reduction and nickel and vanadium removal; and, (v) An improved level of sulfur removal as seen in the observed hydrodesulfurization (HDS) of the total liquid product and the substantially improved, lower level of sulfur in the unconverted 1000° F.+ stream.

The catalyst of the instant invention, besides giving low sediment results for the 650° F.+ boiling cut, also showed improved operability. The evaluation went smoothly at both 760° F. and 770° F. On the other hand, the first generation catalyst evaluation showed evidence of plugging due to accumulated sediment during the course of its evaluation. Operations with the first generation catalyst became somewhat erratic at about 1.54 bbl/pound catalyst age and the unit had to be shut down and partially cleaned out before we could complete the evaluation of the first generation catalyst. With so much trouble due to sediment, it was felt that temperatures could not be raised any higher with the first generation catalyst.

TABLE VIII

EXAMPLE B
Two-Stage Robinson Reactor Catalyst Test Results
Single-Pass, Pure Resid, No Diluent, Once Through Hydrogen
Age = 1.57 to 2.16 Barrels Per Pound (We have now raised temperature ~10° F. for Example I)

| Catalyst | Example I | 1st Generation (HDS-1443B*) |
|---|---|---|
| CSV (Bbl/Lb/Day) | 0.066 | 0.065 |
| Temperature (°F.) (Average both stages) | 770.0 | 760.8 |
| Cut 4: (650° F.+) | | |
| Existent IP Sediment (wt %) | 0.02 | 0.15 |
| Accelerated IP Sediment (wt %) | 0.17 | 0.59 |
| Total Liquid Product | | |
| % Sulfur Removal | 76 | 71 |
| % Carbon Residue Reduction | 58 | 53 |
| % Nickel Removal | 73 | 63 |
| % Vanadium Removal | 95 | 88 |
| % Hydroconversion of 1000° F.+ | 56.5 | 52.8 |

TABLE VIII-continued

EXAMPLE B
Two-Stage Robinson Reactor Catalyst Test Results
Single-Pass, Pure Resid, No Diluent, Once Through Hydrogen
Age = 1.57 to 2.16 Barrels Per Pound (We have now raised temperature ~10° F. for Example I)

| Catalyst | Example I | 1st Generation (HDS-1443B*) |
|---|---|---|
| to 1000° F.– Materials (wt %) Kinetically Adjusted (CSV ONLY) | 57.0 | 51.9 |
| % Hydroconversion of 1000° F.+ to 1000° F.– Materials (wt %) | | |
| Cut 1: up to 650° F. | | |
| Specific Gravity (g/cc) | 0.84 | 0.84 |
| Sulfur (wt %) | 0.1 | 0.2 |
| Cut 2: 650° F.–1000° F. | | |
| Specific Gravity (g/cc) | 0.93 | 0.93 |
| Sulfur (wt %) | 0.9 | 0.9 |
| Cut 3: 1000° F.+ | | |
| Specific Gravity (g/cc) | 1.04 | 1.04 |
| Sulfur (wt %) | 2.1 | 2.5 |

*Criterion HDS-1443B H-OIL catalyst.
**1st order CSTR kinetics (assuming equal rate constants for the 1st- and 2nd- stage reactors); Activation Energy = 65 kcal/mole.

EXAMPLE C

DATA AT +20° F.

In the evaluation of the Example I catalyst of the instant invention, reactor temperatures were raised an additional 10° F. over a period of three days to a final temperature of approximately 780° F. (i.e., the first-stage, second-stage, and average temperatures). Product was collected and analyzed over a range of catalyst age of 2.51 through 2.73 barrels per pound (corresponding approximately to the 39th through 42nd days of the evaluation). Comparative data between the catalyst of the instant invention operating at about +20° F. compared to the first generation nickel/molybdenum H-OIL catalyst (Criterion HDS-1443B) at the same catalyst ages are given in Table IV. The process of the instant invention is superior in that it gives:

(i) About the same Existent IP sediment at 66 wt % 1000° F.+ to 1000° F.– conversion versus that experienced with the first generation nickel/molybdenum H-OIL catalyst operating at only 53 wt % 1000° F.+ to 1000° F.– conversion;

(ii) Relatively low Accelerated IP sediment at 66 wt % 1000° F.+ to 1000° F.– conversion versus a very high level with the first generation nickel/molybdenum H-OIL catalyst operating at only 53 wt % 1000° F.+ to 1000° F.– conversion;

(iii) A very improved level of 1000° F.+ to 1000° F.– wt % conversion by the observed data and once the data from both catalysts are kinetically adjusted to the target CSV;

(iv) Improved levels of carbon residue reduction and nickel and vanadium removal; and, (v) An improved level of sulfur removal as seen in the observed hydrodesulfurization (HDS) of the total liquid product and the substantially improved, lower level of sulfur in the unconverted 1000° F.+ stream.

It was noted that the specific gravity of the unconverted 1000° F.+ stream was slightly higher with the catalyst of the instant invention operating at about +20° F. compared to the level obtained with the first generation H-OIL catalyst when both were at catalyst ages of 2.51 through 2.73 barrels per pound.

The catalyst of the instant invention continued to show good operability. The evaluation went smoothly at 760° F., 770° F., and 780° F. The end of the run represented one of the highest conversion levels that we had ever successfully run in the two-stage Robinson reactor. The ~+20° F. portion of the run lasted about ten days and lined-out data were collected on the last seven days. We would not say that the catalyst of the instant invention could run indefinitely at ~+20° F. (corresponding to ~+13.5 w % 1000° F.+ to 1000° F.− bp conversion) compared to the HDS-1443B catalyst. The run terminated due to problems in the recovery section.

As discussed above, the first generation catalyst evaluation showed evidence of plugging due to accumulated sediment early in the course of the run. Operations became somewhat erratic at about 1.54 bbl/pound catalyst age and the unit had to be shut down and partially cleaned out before we could complete the evaluation of the first generation catalyst (this represented the same age at which we were first able to raise temperature on the catalyst of the instant invention with no trouble). Additional plugging incidents (presumably caused by high sedimentation) occurred at ~3 and ~3.5 bbl/lb catalyst age thereby terminating the evaluation of the first generation HDS-1443B catalyst. Note again, that the entire evaluation of the first generation HDS-1443B catalyst was performed at a relatively low temperature (~760° F.) and a relatively low level of 1000° F.+ to 1000° F.− bp conversion (~52 to 53 w %). With so much operability trouble, it was felt that temperatures could not be raised any higher with the first generation HDS-1443B catalyst.

TABLE IX

EXAMPLE C
Two-Stage Robinson Reactor Catalyst Test Results
Single-Pass, Pure Resid, No Diluent, Once Through Hydrogen
Age = 2.51 to 2.73 Barrels Per Pound
(We have now raised temperature ~20° F. for Example I)

| Catalyst | Example I | 1st Generation (HDS-1443B*) |
|---|---|---|
| CSV (Bbl/Lb/Day) | 0.066 | 0.064 |
| Temperature (°F.) (Average both stages) | 779.5 | 759.8 |
| Cut 4: (650° F.+) | | |
| Existent IP Sediment (wt %) | 0.17 | 0.13 |
| Accelerated IP Sediment (wt %) | 0.32 | 0.73 |
| Total Liquid Product | | |
| % Sulfur Removal | 77 | 67 |
| % Carbon Residue Reduction | 62 | 50 |
| % Nickel Removal | 76 | 61 |
| % Vanadium Removal | 96 | 87 |
| % Hydroconversion of 1000° F.+ to 1000° F.− Materials (wt %) | 65.8 | 52.0 |
| Kinetically Adjusted (CSV ONLY) % Hydroconversion of 1000° F.+ to 1000° F.− Materials (wt %) | 66.2 | 52.7 |
| Cut 1: up to 650° F. | | |
| Specific Gravity (g/cc) | 0.84 | 0.85 |
| Sulfur (wt %) | 0.2 | 0.2 |
| Cut 2: 650° F.–1000° F. | | |
| Specific Gravity (g/cc) | 0.93 | 0.93 |
| Sulfur (wt %) | 1.0 | 1.0 |

TABLE IX-continued

EXAMPLE C
Two-Stage Robinson Reactor Catalyst Test Results
Single-Pass, Pure Resid, No Diluent, Once Through Hydrogen
Age = 2.51 to 2.73 Barrels Per Pound
(We have now raised temperature ~20° F. for Example I)

| Catalyst | Example I | 1st Generation (HDS-1443B*) |
|---|---|---|
| Cut 3: 1000° F.+ | | |
| Specific Gravity (g/cc) | 1.06 | 1.04 |
| Sulfur (wt %) | 2.3 | 2.7 |

*Criterion HDS-1443B H-OIL catalyst.
**1st order CSTR kinetics (assuming equal rate constants for the 1st- and 2nd- stage reactors); Activation Energy = 65 kcal/mole.

I claim:

1. A process for hydrotreating a charge hydrocarbon feed containing components boiling above 1000° F. and sulfur, metals, and carbon residue, said process comprises:

contacting said hydrocarbon feed with hydrogen at isothermal hydroprocessing conditions in the presence of a catalyst, said catalyst including a porous alumina support containing $\leq 0.5$ wt % of silica, wherein no silicon containing components are intentionally added to the alumina, alumina support, impregnating solution or impregnating solutions, said porous alumina support bearing 2.2–6 wt % of a Group VIII metal oxide, 7–24 wt % of a Group VIB metal oxide and less than 0.3 wt % of a phosphorus oxide, with no phosphorous containing components intentionally added during the preparation of said catalyst, said catalyst having a Total Surface Area of 195–230 $m^2/g$, a Total Pore Volume of 0.82–0.98 cc/g, and a Pore Diameter Distribution wherein 27.0–34.0% of the Total Pore Volume is present as macropores of diameter greater than 250 Å, 66.0–73.0% of the Total Pore Volume is present as micropores of diameter less than 250 Å, 55–64.5% of the micropore volume is present as micropores of diameter ±25 Å about a pore mode by volume of 110–130 Å, less than 0.05 cc/g of micropore volume is present as micropores with diameters less than 80 Å, thereby forming hydroprocessed product containing a decreased content of components boiling above 1000° F. a decreased content of sulfur, a decreased content of metals and a decreased content of carbon residue, and recovering said hydroprocessed product and recovering from said hydroprocessed product a portion boiling above 650° F., said portion containing a decreased content of sediment.

2. A process for hydrotreating a charge hydrocarbon feed as claimed in claim 1 wherein said Group VIB metal oxide is molybdenum oxide in an amount of 12.5–15.5 wt %.

3. A process for hydrotreating a charge hydrocarbon feed as claimed in claim 1 wherein said Group VIII metal oxide is nickel oxide in an amount of 3.0–3.9 wt. %.

4. A process for hydrotreating a charge hydrocarbon feed as claimed in claim 1 wherein the content of $SiO_2$ is $\leq 0.41$ wt %.

5. A process for hydrotreating a charge hydrocarbon feed as claimed in claim 1 wherein the phosphorous oxide is $P_2O_5$ and wherein the content of the $P_2O_5$ is <0.1 wt. % with no phosphorous containing components intentionally added during catalyst preparation.

6. A process for hydrotreating a charge hydrocarbon feed as claimed in claim 1 wherein said Total Surface Area is about 200–225 $m^2/g$.

7. A process for hydrotreating a charge hydrocarbon feed as claimed in claim 1 wherein said Total Pore Volume is about 0.82–0.90 cc/g.

8. A process for hydrotreating a charge hydrocarbon feed containing components boiling about 1000° F. and sulfur, metals, and carbon residue, said process comprises:

contacting said hydrocarbon feed with hydrogen at isothermal hydroprocessing conditions in the presence of a catalyst, said catalyst including a porous alumina support containing ≦0.5 wt % of silica, wherein no silicon containing components are intentionally added to the alumina, alumina support, impregnating solution or impregnating solutions, said porous alumina support bearing 2.2–6 wt % of a Group VIII metal oxide, 7–24 wt % of a Group VIB metal oxide and less than 0.3 wt % of a phosphorus oxide, with no phosphorous containing components intentionally added during the preparation of said catalyst, said catalyst having a Total Surface Area of 195–230 m₂/g, a Total Pore Volume of 0.82–0.98 cc/g, and a Pore Diameter Distribution wherein 27.0–34.0% of the Total Pore Volume is present as macropores of diameter greater than 250 Å, 66.0–73.0% of the Total Pore Volume is present as micropores of diameter less than 250 Å, 55–64.5% of the micropore volume is present as micropores of diameter ±25 Å about a pore mode by volume of 110–130 Å, 46.5–56.5% of the pore volume of pores with diameters ≦200 Å is present as micropores of diameter ±20 Å about a pore mode by volume of 110–130 Å, less than 0.05 cc/g of micropore volume is present as micropores with diameters less than 80 Å, 17–27% of the Total Pore Volume is present as pores with a diameter >600 Å and 0.12–0.20 cc/g of the Total Pore Volume is present as pores having a diameter >1200 Å, thereby forming hydroprocessed product containing a decreased content of components boiling above 1000° F. a decreased content of sulfur, a decreased content of metals and a decreased content of carbon residue and recovering said hydroprocessed product, and recovering from said hydroprocessed product a portion having a boiling point above 650° F., said portion containing a decreased content of sediment.

9. A process for hydrotreating a charge hydrocarbon feed as claimed in claim 8 wherein said Group VIB metal oxide is molybdenum oxide in an amount of 12.5–15.5 wt %.

10. A process for hydrotreating a charge hydrocarbon feed as claimed in claim 8 wherein said Group VIII metal oxide is nickel oxide in an amount of 3.0–3.9 wt %.

11. A process for hydrotreating a charge hydrocarbon feed as claimed in claim 8 wherein the content of $SiO_2$ is ≦0.41 wt %.

12. A process for hydrotreating a charge hydrocarbon feed as claimed in claim 8 wherein the phosphorous oxide is $P_2O_5$ and wherein the content of the $P_2O_5$ is <0.1 wt. % with no phosphorous containing components intentionally added during catalyst preparation.

13. A process for hydrotreating a charge hydrocarbon feed as claimed in claim 8 wherein said Total Surface Area is about 200–225 m²/g.

14. A process for hydrotreating a charge hydrocarbon feed as claimed in claim 8 wherein said Total Pore Volume is about 0.82–0.90 cc/g.

15. A process for hydrotreating a charge hydrocarbon feed containing components boiling above 1000° F. and sulfur, metals, and carbon residue, said process comprises:

contacting said hydrocarbon feed with hydrogen at isothermal hydroprocessing conditions in the presence of a catalyst, said catalyst including a porous alumina support containing ≦0.41 wt % of silica, wherein no silicon containing components are intentionally added to the alumina, alumina support, impregnating solution or impregnating solutions, said porous alumina support bearing 3.0–3.9 wt % of nickel oxide, 12.5–15.5 wt % of molybdenum oxide and ≦0.1 wt % of a phosphorus oxide, with no phosphorous containing components intentionally added during the preparation of said catalyst, said catalyst having a Total Surface Area of 200–225 m²/g, a Total Pore Volume of 0.82–0.98 cc/g, and a Pore Diameter Distribution wherein 27.0–34.0% of the Total Pore Volume is present as macropores of diameter greater than 250 Å, 66.0–73.0% of the Total Pore Volume is present as micropores of diameter less than 250 Å, 55–64.5% of the micropore volume is present as micropores of diameter ±25 Å about a pore mode by volume of 110–130 Å, less than 0.05 cc/g of micropore volume is present as micropores with diameters less than 80 Å, thereby forming hydroprocessed product containing a decreased content of components boiling above 1000° F. and a decreased content of sulfur, a decreased content of metals and a decreased content of carbon residue, and recovering said hydroprocessed product and recovering from said hydroprocessed product a portion boiling above 650° F., said portion containing decreased content of sediment.

16. A process for hydrotreating a charge hydrocarbon feed containing components boiling above 1000° F. and sulfur, metals, and carbon residue, said process comprises:

contacting said hydrocarbon feed with hydrogen at isothermal hydroprocessing conditions in the presence of a catalyst, said catalyst including a porous alumina support containing ≦0.41 wt % of silica, said porous alumina support bearing 3.0–3.9 wt % of nickel oxide, 12.5–15.5 wt % of molybdenum oxide and ≦0.1 wt % of a phosphorus oxide, with no phosphorous containing components intentionally added during the preparation of said catalyst, said catalyst having a Total Surface Area of 200–225 m²/g, a Total Pore Volume of 0.82–0.98 cc/g, and a Pore Diameter Distribution wherein 27.0–34.0% of the Total Pore Volume is present as macropores of diameter greater than 250 Å, 66.0–73.0% of the Total Pore Volume is present as micropores of diameter less than 250 Å, 55–64.5% of the micropore volume is present as micropores of diameter ±25 Å about a pore mode by volume of 110–130 Å, 46.5–56.5% of the pore volume of pores with diameters ≦200 Å is present as micropores of diameter ±20 Å about a pore mode by volume of 110–130 Å, less than 0.05 cc/g of micropore volume is present as micropores with diameters less than 80 Å, 17–27% of the Total Pore Volume is present as pores with a diameter >600 Å and 0.12–0.20 cc/g of the Total Pore Volume is present as pores having a diameter >1200 Å, thereby forming hydroprocessed product containing a decreased content of components boiling above 1000° F. and a decreased content of sulfur, a decreased content of metals and a decreased content of carbon residue, and recovering said hydroprocessed product, and recovering from said hydroprocessed product a portion boiling above 650° F. containing decreased content of sediment.

17. In a process for hydrotreating a charge hydrocarbon feed containing components boiling above 1000° F. and sulfur, metals and carbon residue to form hydroprocessed product, said product containing a decreased content of components boiling above 1000° F. and a decreased content of sulfur, a decreased content of metals and a decreased content of carbon residue and recovering said hydroprocessed product, an improvement which allows operations at +10° F., increases conversion of components boiling above 1000° F. to product boiling below 1000° F. by 5 wt %, and reduces Existent IP Sediment Test values in the portion of the hydroprocessed product boiling above 650° F. which comprises contacting said hydrocarbon feed with hydrogen at isothermal hydroprocessing conditions in the presence of a catalyst, said catalyst including a porous alumina support containing ≦0.5 wt % of silica, wherein no silicon containing components are intentionally added to the alumina, alumina support, impregnating solution or impregnating solutions, said porous alumina support bearing 2.2–6 wt % of a Group VIII metal oxide, 7–24 wt % of a Group VIB metal oxide and less than 0.3 wt % of a phosphorus oxide, with no phosphorous containing components intentionally added during the preparation of said catalyst, said catalyst having a Total Surface Area of 195–230 m²/g, a Total Pore Volume of 0.82–0.98 cc/g, and a Pore Diameter Distribution wherein 27.0–34.0% of the Total Pore Volume is present as macropores of diameter greater than 250 Å, 66.0–73.0% of the Total Pore Volume is present as micropores of diameter less than 250 Å, 55–64.5% of the micropore volume is present as micropores of diameter ±25 Å, about a pore mode by volume of 110–130 Å, less than 0.05 cc/g of micropore volume is present as micropores with diameters less than 80 Å.

18. In a process for hydrotreating a charge hydrocarbon feed containing components boiling above 1000° F. and sulfur, metals and carbon residue to form hydroprocessed product, and hydroprocessed product containing a decreased content of components boiling above 1000° F. and a decreased content of sulfur, a decreased content of metals and a decreased content of carbon residue and recovering said hydroprocessed product, an improvement which allows operations at +10° F., increases conversion of components boiling above 1000° F. to product boiling below 1000° F. by 5 wt %, and reduces Existent IP Sediment Test values in the portion of the hydroprocessed product boiling above 650° F. which comprises contacting said hydrocarbon feed with hydrogen at isothermal hydroprocessing conditions in the presence of a catalyst, said catalyst including a porous alumina support containing ≦0.5 wt % of silica, wherein no silicon containing components are intentionally added to the alumina, alumina support, impregnating solution or impregnating solutions, said porous alumina support bearing 2.2–6 wt % of a Group VIII metal oxide, 7–24 wt % of a Group VIB metal oxide and less than 0.3 wt % of a phosphorus oxide, with no phosphorous containing components intentionally added during the preparation of said catalyst, said catalyst having a Total Surface Area of 195–230 m²/g, a Total Pore Volume of 0.82–98 cc/g, and a Pore Diameter Distribution wherein 27.0–34.0% of the Total Pore Volume is present as macropores of diameter greater than 250 Å, 66.0–73.0% of the Total Pore Volume is present as micropores of diameter less than 250 Å, 55–64.5% of the micropore volume is present as micropores of diameter ±25 Å about a pore mode by volume of 100–130 Å, 46.5–56.5% of the pore volume of pores with diameters ≦200 Å is present as micropores of diameter ±20 Å about a pore mode by volume of 110–130 Å, less than 0.05 cc/g of micropore volume is present as micropores with diameters less than 80 Å, 17–27% of the Total Pore Volume is present as pores with a diameter >600 Å and 0.12–0.20 cc/g of the Total Pore Volume is present as pores having a diameter >1200 Å.

19. In a process for hydrotreating a charge hydrocarbon feed containing components boiling above 1000° F. and sulfur, metals and carbon residue to form hydroprocessed product, said hydroprocessed product containing a decreased content of components boiling above 1000° F. and a decreased content of sulfur, a decreased content of metals and a decreased content of carbon residue and recovering said hydroprocessed product, an improvement which allows operations at +20° F., increases conversion of components boiling above 1000° F. to product boiling below 1000° F. by 13.5 wt %, and reduces Accelerated IP Sediment Test values in the portion of the hydroprocessed product boiling above 650° F. which comprises contacting said hydrocarbon feed with hydrogen at isothermal hydroprocessing conditions in the presence of a catalyst, said catalyst including a porous alumina support containing ≦0.5 wt % of silica, wherein no silicon containing components are intentionally added to the alumina, alumina support, impregnating solution or impregnating solutions, said porous alumina support bearing 2.2–6 wt % of a Group VIII metal oxide, 7–24 wt % of a Group VIB metal oxide and less than 0.3 wt % of a phosphorus oxide, with no phosphorous containing components intentionally added during the preparation of said catalyst, said catalyst having a Total Surface Area of 195–230 m²/g, a Total Pore Volume of 0.82–98 cc/g, and a Pore Diameter Distribution wherein 27.0–34.0% of the Total Pore Volume is present as macropores of diameter greater than 250 Å, 66.0–73.0% of the Total Pore Volume is present as micropores of diameter less than 250 Å, 55–64.5% of the micropore volume is present as micropores of diameter ±25 Å about a pore mode by volume of 110–130 Å, less than 0.05 cc/g of micropore volume is present as micropores with diameters less than 80 Å.

20. In a process for hydrotreating a charge hydrocarbon feed containing components boiling above 1000° F. and sulfur, metals and carbon residue to form hydroprocessed product, said hydroprocessed product containing decreased content of components boiling above 1000° F. and a decreased content of sulfur, a decreased content of metals and a decreased content of carbon residue and recovering said hydroprocessed product, an improvement which allows operations at +20° F., increases conversion of components boiling above 1000° F. to product boiling below 1000° F. by 13.5 wt %, and reduces Accelerated IP Sediment Test values in the portion of the hydroprocessed product boiling above 650° F. which comprises contacting said hydrocarbon feed with hydrogen at isothermal hydroprocessing conditions in the presence of a catalyst, said catalyst including a porous alumina support containing ≦0.5 wt % of silica, wherein no silicon containing components are intentionally added to the alumina, alumina support, impregnating solution or impregnating solutions, said porous alumina support bearing 2.2–6 wt % of a Group VIII metal oxide, 7–24 wt % of a Group VIB metal oxide and less than 0.3 wt % of a phosphorus oxide, with no phosphorous containing components intentionally added during the preparation of said catalyst, said catalyst having a Total Surface Area of 195–230 m$^2$/g, a Total Pore Volume of 0.82–98 cc/g, and a Pore Diameter Distribution wherein 27.0–34.0% of the Total Pore Volume is present as macropores of diameter greater than 250 Å, 66.0–73.0% of the Total Pore Volume is present as micropores of diameter less than 250 Å, 55–64.5% of the micropore volume is present as micropores of diameter ±25 Å about a pore mode by volume of 110–130 Å, 46.5–56.5% of the pore volume of pores with diameters ≦200 Å is present as micropores of diameter ±20 Å about a pore mode by volume of 110–130 Å, less than 0.05 cc/g of micropore volume is present as micropores with diameters less than 80 Å, 17–27% of the Total Pore Volume is present as pores with a diameter >600 Å and 0.12–0.20 cc/g of the Total Pore Volume is present as pores having a diameter >1200 Å.

21. A hydrotreating catalyst characterized by stability at up to 10° F. over normal hydrotreating process conditions consisting essentially of:

a porous alumina support containing ≦0.5 wt % of silica, wherein no silicon containing components are intentionally added to the alumina, alumina support, impregnating solution or impregnating solutions, 2.2–6 wt % of a Group VIII metal oxide supported by said porous alumina support, 7–24 wt % of a Group VIB metal oxide supported by said porous alumina support and, less than about 0.3 wt % of a phosphorus oxide, with no phosphorous containing components intentionally added during the preparation of said catalyst, said catalyst having a Total Surface Area of 195–230 m$^2$/g, a Total Pore Volume of 0.82–98 cc/g, and a Pore Diameter Distribution wherein 27.0–34.0% of the Total Pore Volume is present as macropores of diameter greater than 250 Å, 66.0–73.0% of the Total Pore Volume is present as micropores of diameter less than 250 Å, 55–64.5% of the micropore volume is present as micropores of diameter ±25 Å about a pore mode by volume of 110–130 Å, less than 0.05 cc/g of micropore volume is present as micropores with diameters less than 80 Å.

* * * * *

UNITED STATES PATENT AND TRADEMARK OFFICE
CERTIFICATE OF CORRECTION

Page 1 of 2

PATENT NO. : 5,827,421

DATED : October 27, 1998

INVENTOR(S) : David Edward Sherwood, Jr.

It is certified that error appears in the above-identified patent and that said Letters Patent is hereby corrected as shown below:

At Col. 6, lines 63-64, please delete "m /g" and replace it with --$m^2/g$--.

At Col. 8, line 3, please delete "SiO" and replace it with --$SiO_2$--.

At Col. 10, line 64, please delete "typmetals," and replace it with --typified by--.

At Col. 14, line 33, please delete "SiO2" and replace it with --$SiO_2$--.

At Col. 14, line 55, please delete "total" and replace it with --Total--.

At Col. 15, line 9, between "Total" and "Volume", please delete "pore" and replace it with --Pore--.

At Col. 15, line 59, please delete "SiO2" and replace it with --$SiO_2$--.

At Col. 16, line 59, please delete "supra" and replace it with --_supra_--.

At Col. 17, line 19, please delete "supra" and replace it with --_supra_--.

At Cols. 19-20, in TABLE III, under the last column entitled "U.S. Pat. No. / application Ser. No. Reference", please delete the U.S. Patent No. (corresponding to Application Serial No. 08/425,971) shown as "5,445,908" and replace it with --5,435,908-- in the following five instances: (1) in the line beginning with "Silicon (as $SiO_2$)"; (2) in the line beginning with "Phosphorus (as $P_2O_5$)"; (3) in the line beginning with "PV, ±25 Å from dV/dD MAX,"; (4) in the line beginning with "PV, cc/g >1000 Å % of TPV"; and (5) in the line beginning with "Average Pellet Diameter, Inches".

UNITED STATES PATENT AND TRADEMARK OFFICE
CERTIFICATE OF CORRECTION

PATENT NO.    :   5,827,421

DATED         :   October 27, 1998

INVENTOR(S)   :   David Edward Sherwood, Jr.

It is certified that error appears in the above-identified patent and that said Letters Patent is hereby corrected as shown below:

At Cols. 19-20, in TABLE III, under the column entitled "Art Ranges", in the line under the line beginning with "Phosphorus (as $P_2O_5$)", please add --(None Added)--.

At Col. 22, line 36, please delete "supra" and replace it with --<u>supra</u>--.

At Col. 31, line 42, before the word "hydroprocessed", please delete "and" and replace it with --said--.

Signed and Sealed this

First Day of June, 1999

Q. TODD DICKINSON

*Attest:*

*Attesting Officer*   Acting Commissioner of Patents and Trademarks